(12) United States Patent
Glenn et al.

(10) Patent No.: US 12,602,560 B1
(45) Date of Patent: Apr. 14, 2026

(54) QR CODE VERIFICATION ENGINE

(71) Applicant: Bank of America Corporation, Charlotte, NC (US)

(72) Inventors: Allison Glenn, Chicago, IL (US); Benjamin F. Tweel, Romeoville, IL (US); Khushbu Bansal, Bolingbrook, IL (US); Jack Bishop, Evanston, IL (US); Siyuan Li, Naperville, IL (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 19/059,670

(22) Filed: Feb. 21, 2025

(51) Int. Cl.
*G06K 7/14* (2006.01)

(52) U.S. Cl.
CPC .................................. *G06K 7/1417* (2013.01)

(58) Field of Classification Search
CPC .... G06K 7/1417; G06Q 20/40; G06Q 20/409; G06Q 20/3674
See application file for complete search history.

(56) References Cited

U.S. PATENT DOCUMENTS

| | | | | |
|---|---|---|---|---|
| 6,606,396 | B1 * | 8/2003 | Ishibashi .......... | G06K 19/06037 283/72 |
| 8,625,167 | B2 * | 1/2014 | Amagai .................... | G06T 3/00 235/494 |
| 9,760,818 | B2 * | 9/2017 | Asthana ............... | G06K 7/1434 |
| 9,794,253 | B2 | 10/2017 | Narayan et al. | |
| 10,140,563 | B2 * | 11/2018 | Lau .................. | G06K 19/06037 |
| 10,810,390 | B2 * | 10/2020 | Hegendoerfer .... | G06K 7/10722 |
| 11,657,177 | B2 | 5/2023 | Babcock et al. | |
| 11,972,444 | B1 * | 4/2024 | Scheir ............. | G06K 19/06037 |
| 12,197,625 | B1 * | 1/2025 | Stafford ................. | G06F 21/16 |
| 2011/0290882 | A1 | 12/2011 | Gu et al. | |
| 2013/0054271 | A1 | 2/2013 | Langford et al. | |
| 2013/0124855 | A1 | 5/2013 | Varadarajan et al. | |
| 2013/0167208 | A1 | 6/2013 | Shi | |
| 2013/0219479 | A1 | 8/2013 | DeSoto et al. | |
| 2014/0048596 | A1 * | 2/2014 | Grigg .................... | G06Q 20/36 235/380 |

(Continued)

*Primary Examiner* — Daniel I Walsh
(74) *Attorney, Agent, or Firm* — Banner & Witcoff, Ltd.

(57) ABSTRACT

A QR Code Verification Engine provides a multi-layered security framework for generating, validating, and authenticating QR codes while preventing tampering, fraud, and unauthorized access. The system embeds a hidden security layer within the QR code using steganographic encoding or invisible watermarking techniques, ensuring detection of any modifications. The hidden layer is encrypted using asymmetric cryptography, allowing only an authorized verification system to extract and validate it. An AI-powered tamper detection module analyzes QR codes for anomalies, while cryptographic hash verification ensures integrity. The system employs biometric authentication, push notification approvals, and contextual security measures to enhance user verification. Dynamic QR codes with expiration rules prevent replay attacks. Secure offline verification allows authentication without network connectivity. The system integrates with financial platforms, web security tools, and real-time fraud detection mechanisms, ensuring a highly secure and scalable QR code validation framework for transactions, identity verification, and access control applications.

20 Claims, 5 Drawing Sheets

Scalable System Architecture Diagram

(56)                      References Cited

U.S. PATENT DOCUMENTS

| | | | |
|---|---|---|---|
| 2015/0088674 A1 | 3/2015 | Flurscheim et al. | |
| 2015/0295711 A1* | 10/2015 | Javidi | G09C 5/00 |
| | | | 713/193 |
| 2015/0358163 A1 | 12/2015 | Carter | |
| 2019/0197279 A1* | 6/2019 | Wang | G06K 7/1417 |
| 2021/0084451 A1* | 3/2021 | Williams | A61B 5/165 |
| 2021/0103786 A1* | 4/2021 | Yoshida | H04L 9/0861 |
| 2021/0117983 A1* | 4/2021 | Liu | G06Q 30/0185 |
| 2022/0150377 A1* | 5/2022 | Kunori | H04L 9/3236 |
| 2022/0274729 A1* | 9/2022 | Kelly | B65B 61/025 |
| 2023/0206329 A1* | 6/2023 | Cella | G06Q 20/405 |
| 2023/0342770 A1* | 10/2023 | Ryoo | G06F 21/33 |
| 2024/0296609 A1* | 9/2024 | Amir | G06K 19/06103 |
| 2024/0386432 A1* | 11/2024 | Lee | G06Q 40/03 |
| 2025/0131911 A1* | 4/2025 | Ouimette | G10L 13/08 |
| 2025/0155882 A1* | 5/2025 | Ciocarlie | G05B 19/41875 |
| 2025/0279887 A1* | 9/2025 | Nine | H04L 9/3297 |

* cited by examiner

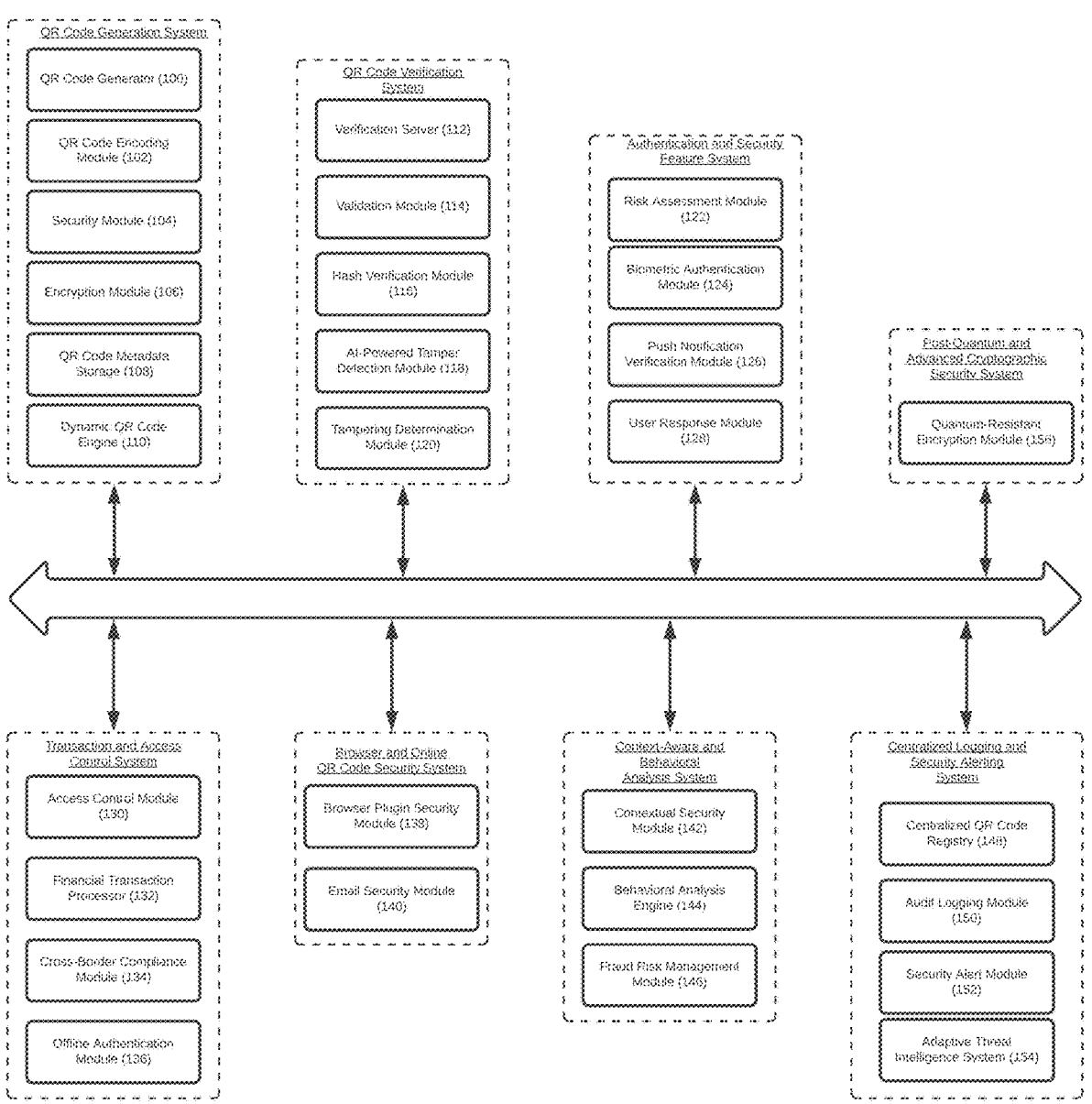
FIG. 1: Sample System Architecture Diagram

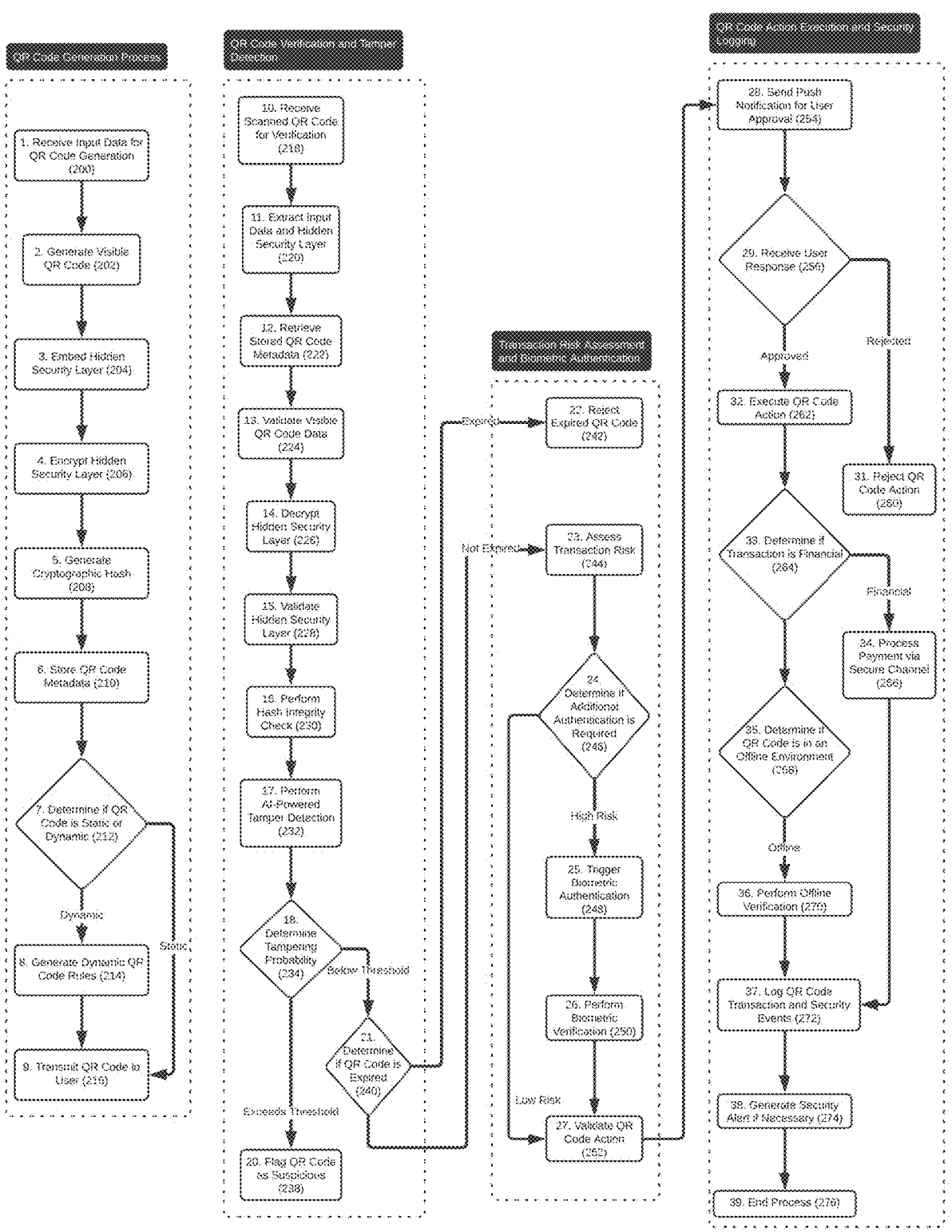
FIG. 2: Sample Flow Diagram

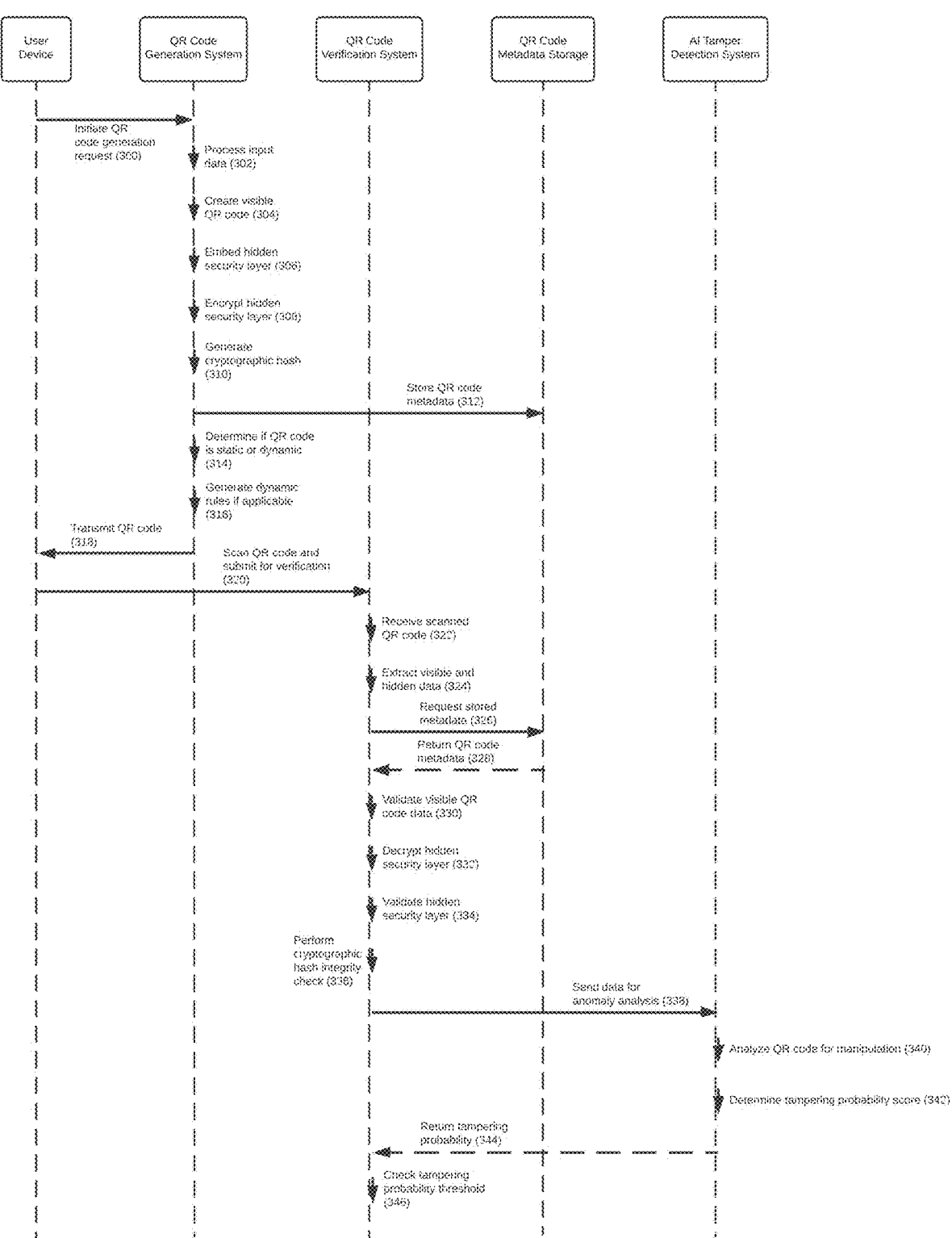
FIG. 3A: Sample Sequence Diagram

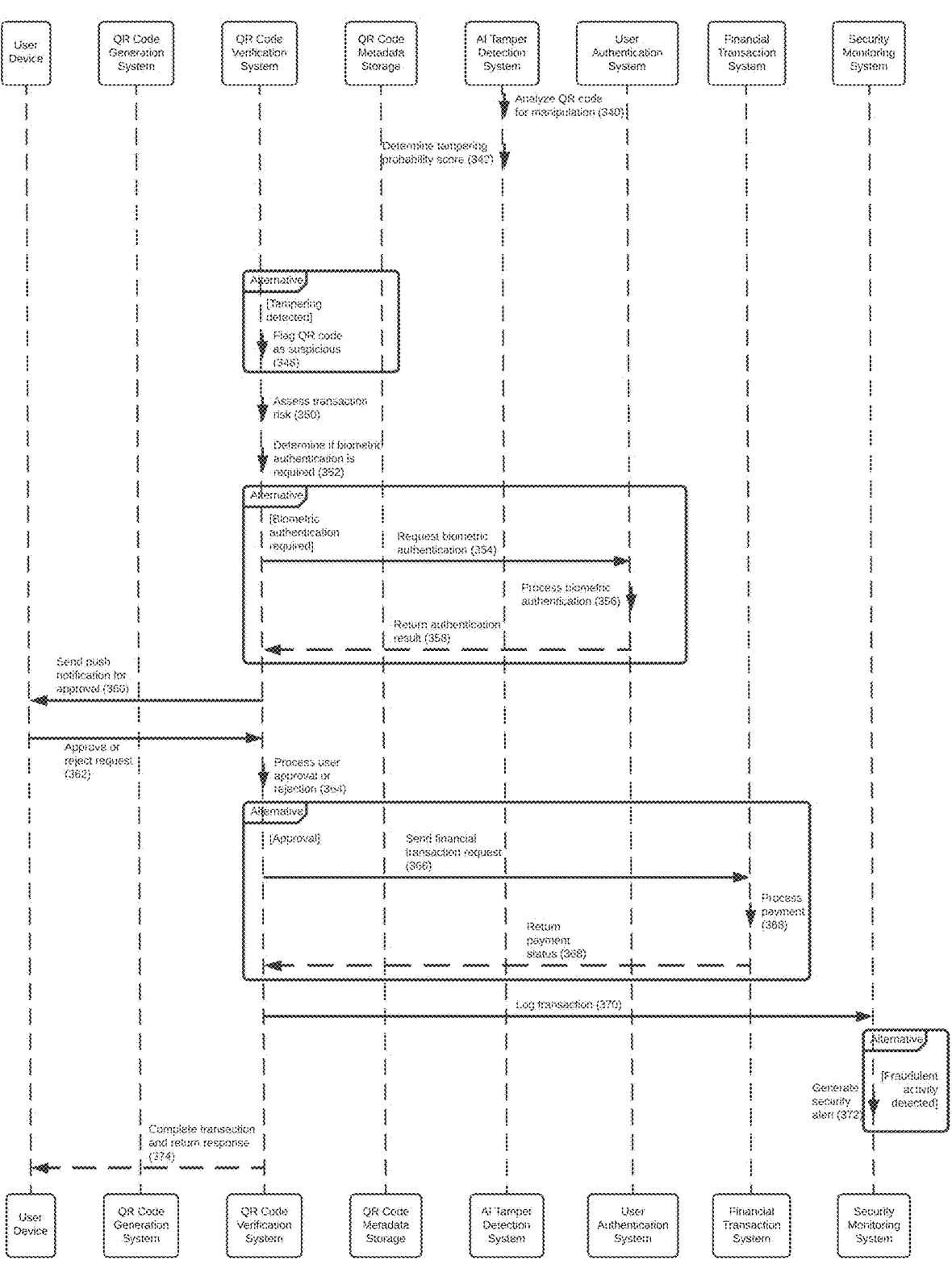
FIG. 3B: Sample Sequence Diagram (Cont'd)

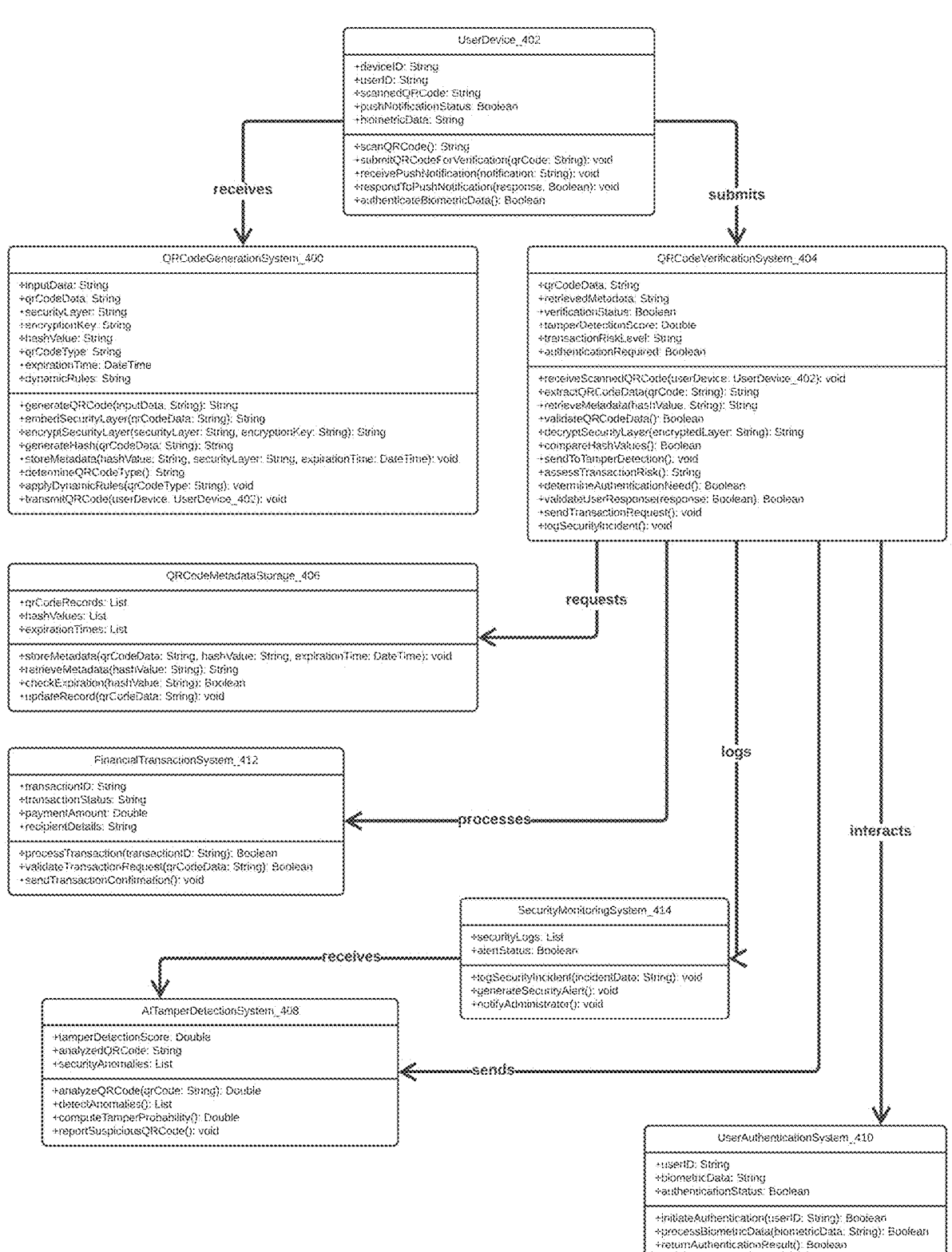
FIG. 4: Sample Class Diagram

QR CODE VERIFICATION ENGINE

TECHNICAL FIELD

The inventions disclosed herein pertain to the fields of cryptography and secure communications, computer security and fraud prevention, image processing and pattern recognition, electronic payment security and transaction processing, and automatic data recognition and encoding. In the field of cryptography and secure communications, the invention employs steganography, invisible watermarking, and hash-based verification to ensure QR code authenticity and resistance to tampering. In the field of computer security and fraud prevention, the invention provides real-time monitoring and validation of QR codes, utilizing AI-powered anomaly detection to prevent malicious alterations and phishing attacks. In the field of image processing and pattern recognition, the invention integrates AI-driven tamper detection and steganographic methods to embed hidden security markers within QR codes, enabling automated fraud detection. In the field of electronic payment security and transaction processing, the invention enhances financial transaction security by linking dynamically generated QR codes to banking networks, ensuring secure payment processing while preventing unauthorized duplication or misuse. In the field of automatic data recognition and encoding, the invention incorporates encrypted metadata within QR codes to facilitate authentication, fraud prevention, and offline verification, while also implementing time-sensitive QR codes to enhance security in digital authentication and transactional applications.

DESCRIPTION OF THE RELATED ART

The widespread adoption of QR codes in digital transactions, information sharing, and customer engagement has introduced significant vulnerabilities that expose users and businesses to security threats. QR codes, by their very nature, encode data that is often opaque to users, making it easy for attackers to replace or manipulate codes without immediate detection. Malicious actors target this opacity by generating fraudulent QR codes that direct users to phishing sites, distribute malware, or facilitate unauthorized financial transactions. As a result, individuals interacting with QR codes lack a reliable mechanism to verify their authenticity before scanning, leading to an increase in cyberattacks and financial fraud.

One of the most prevalent security risks associated with QR codes is their susceptibility to tampering. Attackers can easily replace legitimate QR codes with fraudulent ones, particularly in public or commercial settings where printed or digital codes are widely used. A malicious QR code pasted over a legitimate one at a retail checkout, for instance, can redirect payments to an unauthorized account. Similarly, malicious QR codes embedded in marketing materials or websites can lead unsuspecting users to harmful links, resulting in credential theft or malware installation.

The lack of authentication mechanisms for QR codes exacerbates the problem, as current QR code readers do not provide verification before redirecting users to encoded destinations. Users who scan QR codes have no way of determining whether the embedded link is legitimate, making them vulnerable to deceptive redirection. This issue is particularly severe in financial transactions, where an unauthorized QR code can reroute payments, resulting in financial losses for both individuals and businesses. Without a secure validation system, there is no effective way to differentiate between genuine and fraudulent QR codes.

Another challenge is the increasing sophistication of QR code fraud techniques. Attackers are leveraging steganography and other covert methods to embed malicious payloads within QR codes, making them appear legitimate while carrying hidden threats. This makes traditional QR code scanning tools inadequate, as they lack the capability to detect or analyze such advanced forms of manipulation. As QR code fraud techniques evolve, existing security measures struggle to keep pace, leaving users at greater risk.

Businesses that rely on QR codes for authentication and payment processing face the additional problem of ensuring that their codes remain secure against duplication and unauthorized reuse. Many existing QR code solutions generate static codes, which can be copied, shared, or reused for fraudulent purposes. If a QR code is meant to authenticate a transaction but can be duplicated and used elsewhere, it creates an opportunity for unauthorized transactions. This problem is particularly acute in industries that rely on QR codes for ticketing, identity verification, or secure access, where a single compromised QR code can lead to significant breaches.

Beyond security concerns, QR code usability presents another major problem. While QR codes provide a convenient method of accessing digital content, the absence of an independent verification step often forces users to trust the encoded data blindly. This lack of transparency makes QR codes an attractive target for cybercriminals who target this trust to launch phishing campaigns and fraudulent transactions. Users need a way to interact with QR codes confidently without the constant fear of being misled by malicious actors.

Phishing attacks utilizing QR codes have become increasingly common, particularly in email scams and digital advertisements. Attackers embed malicious QR codes in emails or documents that appear to be from legitimate sources, tricking users into scanning them and unknowingly providing sensitive information. Traditional cybersecurity tools that focus on detecting malicious links in text-based emails are often ineffective against QR code-based phishing attempts, as users must manually scan the code to reveal its contents. This gap in security has allowed attackers to bypass conventional email filtering and website verification mechanisms.

Another issue affecting businesses is the challenge of implementing QR code security without degrading user experience. Adding multiple authentication steps or requiring manual verification can make QR code interactions cumbersome, reducing adoption and convenience. Users expect QR codes to provide seamless access to digital content, transactions, or authentication processes, and any additional security measures must be integrated in a way that does not disrupt usability. Balancing security with ease of use is a persistent challenge that has not been adequately addressed by existing QR code technologies.

Additionally, the use of QR codes in financial transactions introduces regulatory and compliance risks. Financial institutions and payment processors must ensure that QR codes used for transactions comply with security standards and fraud prevention measures. However, without a means to validate QR codes before a transaction occurs, financial institutions remain vulnerable to fraudulent activity. The inability to guarantee QR code authenticity increases risk concerns and exposes financial systems to unauthorized transactions and financial crimes.

The lack of a centralized verification mechanism further compounds these issues. Without a system to authenticate QR codes at the source and verify their integrity in real-time, businesses and individuals are left to rely on manual inspections or post-incident investigations. This reactive approach is insufficient, as it does not prevent fraud from occurring in the first place. A proactive solution is required to ensure that only verified QR codes are used in transactions and digital interactions, preventing fraud before it impacts users.

Another critical problem is the challenge of ensuring QR code security in offline environments. Many QR code authentication systems rely on online validation, which can be impractical in areas with limited internet access. Users in remote locations or environments with restricted connectivity need a way to verify QR codes without depending on real-time internet access. Existing solutions fail to provide offline verification capabilities, leaving many users vulnerable when scanning QR codes in areas with poor network coverage.

A further complication arises in the integration of QR codes with financial and authentication platforms. While QR codes offer an efficient way to process payments and verify identities, there is currently no standardized method to ensure that QR codes generated for these purposes are secure and resistant to tampering. Financial institutions, e-commerce platforms, and authentication services require a robust security framework that allows for seamless integration while maintaining the highest security standards.

Fraud prevention efforts also face limitations due to the difficulty in detecting QR code manipulation through visual inspection. Unlike traditional security elements, such as holograms or embedded chips, QR codes appear as simple pixelated images that are difficult to differentiate by human users. This makes it easier for fraudulent QR codes to be distributed without raising suspicion, allowing attackers to carry out scams without the need for sophisticated attack vectors. A more advanced detection system is necessary to prevent fraudulent QR codes from being used in malicious schemes.

As QR codes continue to be integrated into everyday transactions, authentication, and digital engagement, the long-standing need for a secure, verifiable, and tamper-proof QR code system has remained unmet. Despite the growing reliance on QR codes for financial transactions, ticketing, marketing, and digital authentication, existing solutions fail to address the core security vulnerabilities that make QR codes a prime target for fraud and cyberattacks. Users and businesses alike require a comprehensive security solution that not only verifies QR code authenticity in real-time but also ensures that malicious actors cannot manipulate, duplicate, or fraudulently use QR codes. The absence of such a solution has left industries struggling to balance security with usability, making QR code-based fraud an increasingly urgent issue that demands an innovative and effective solution.

SUMMARY OF THE INVENTION

The invention disclosed herein introduces an advanced QR Code Verification Engine that provides a comprehensive security framework for authenticating, verifying, and protecting QR codes against tampering, fraudulent manipulation, and unauthorized misuse. QR codes are widely used for financial transactions, digital authentication, access control, and consumer engagement, yet they remain highly vulnerable to security threats. This invention enhances the security of QR codes by incorporating a multi-layered approach that includes steganographic security features, invisible watermarking, dynamic QR code rotation, push notification-based verification, AI-powered tamper detection, metadata-driven authentication, hash-based verification, centralized validation, offline authentication, and seamless integration with financial and digital security systems. Through this combination of innovative technologies, the invention ensures that QR codes remain verifiable, secure, and resistant to attack, thereby enhancing trust in QR-based interactions across industries.

The invention fundamentally changes the way QR codes are authenticated by introducing a dual-layer QR code verification mechanism. Unlike conventional QR codes that only encode visible data, this invention embeds an additional hidden security layer within the QR code structure. The hidden layer contains steganographic metadata and invisible watermarking that cannot be detected through visual inspection but can be validated using the QR Code Verification Engine. When a user scans a QR code, the verification system simultaneously analyzes both the visible and hidden layers to determine whether the QR code is authentic. Any discrepancy between the visible QR code and its hidden security features results in immediate invalidation of the code. This dual-layer verification prevents attackers from altering or replacing QR codes without detection, thereby ensuring that only genuine QR codes are accepted.

The QR Code Verification Engine employs AI-powered tamper detection, which leverages machine learning algorithms, pattern recognition models, and anomaly detection techniques to identify QR code fraud in real time. Traditional QR code validation methods do not provide intelligent fraud detection, leaving users vulnerable to increasingly sophisticated manipulation techniques. This invention overcomes such limitations by utilizing artificial intelligence to analyze QR codes for pixel distortions, embedded malicious payloads, manipulated data patterns, and other forms of unauthorized alterations. The AI-driven system continuously learns from emerging QR code fraud patterns, allowing it to adapt to new attack strategies and improve its detection capabilities over time. When a suspicious QR code is detected, the system generates a security alert, preventing users from interacting with potentially harmful content.

The invention also introduces the concept of dynamic rotating QR codes, which serve as a security measure against duplication, unauthorized reuse, and phishing attacks. Conventional QR codes remain static once generated, making them susceptible to copying and distribution by malicious actors. This invention ensures that QR codes can be programmed to dynamically rotate or expire after a predefined period, reducing the risk of unauthorized use. For example, QR codes used for authentication purposes can be configured to regenerate every 60 seconds, ensuring that each QR code instance remains unique and cannot be intercepted or reused by attackers. Dynamic QR codes are particularly useful for time-sensitive applications, such as payment processing, ticketing, secure login verification, and digital access control.

In addition to preventing unauthorized QR code interactions, the invention introduces push notification-based verification, which adds an extra layer of security for users engaging with QR codes. Instead of immediately directing users to the encoded URL or transaction, the system first sends a trusted push notification to the user's verified mobile device or authentication application. The push notification contains the validated action associated with the QR code and requires explicit user approval before the transaction or access request is processed. This approach mitigates the risk of phishing attacks by ensuring that users never interact with fraudulent QR codes unknowingly. The push notification system is designed to work seamlessly with banking applications, enterprise authentication systems, and secure online portals, providing an additional safeguard against QR code-based fraud.

To enhance security in digital environments, the invention incorporates a browser plugin that enables real-time validation of QR codes encountered in online communications. QR codes are increasingly embedded in emails, websites, PDFs, and online advertisements, making them a target for phishing and social engineering attacks. The browser plugin functions as a security gateway that scans and verifies QR codes before users interact with them. When a user hovers over or clicks on a QR code in an email or webpage, the plugin retrieves verification data from the QR Code Verification Engine to determine whether the code is legitimate. If the QR code is found to be suspicious or fraudulent, the user receives a warning, preventing unauthorized redirection to malicious sites. This feature is particularly beneficial for preventing cyberattacks that target QR codes for credential theft and malware distribution.

Another core aspect of the invention is its integration with financial systems, banking applications, and digital wallets, allowing for secure and authenticated QR code transactions. QR codes are widely used for payments, fund transfers, and identity verification, yet existing solutions lack built-in authentication measures. This invention ensures that only verified QR codes can be used for financial transactions, preventing unauthorized redirection of funds to fraudulent accounts. The QR Code Verification Engine verifies each QR code before a payment is processed, ensuring that the QR code is valid, untampered, and issued by an authorized entity. By embedding encrypted security metadata within QR codes, the system mitigates the risk of transaction fraud, ensuring that all payments occur through trusted channels.

The invention also introduces metadata-driven authentication, which enhances QR code security by allowing businesses to define usage rights, conditional validation rules, and location-based restrictions. Unlike traditional QR codes that operate without context, this invention enables organizations to customize QR code security based on predefined parameters. For instance, QR codes used for digital ticketing can be programmed to work only within a specific geofenced location, ensuring that they cannot be transferred or resold outside of designated areas. Similarly, QR codes used for identity authentication can be configured to require secondary biometric verification before granting access. By integrating metadata-driven security measures, the invention ensures that QR codes remain contextually aware and resistant to unauthorized usage.

The QR Code Verification Engine is designed to provide offline authentication capabilities, addressing a critical gap in current QR code security solutions. Many QR-based authentication systems require an active internet connection for verification, which can be impractical in remote locations, areas with poor network coverage, or secure facilities with restricted internet access. This invention embeds encrypted security metadata within the QR code itself, allowing it to be validated locally using a trusted mobile application or dedicated authentication device. Offline verification is particularly useful for applications such as border security, offline payment processing, secure document verification, and emergency authentication scenarios where internet access may not be available.

To enhance the integrity of QR code authentication, the invention employs a hash-based verification system that assigns a unique cryptographic hash to each QR code at the time of generation. This cryptographic fingerprint serves as an immutable reference that allows for real-time verification. If a QR code is altered in any way, its cryptographic hash will no longer match the original reference stored in the verification database, instantly invalidating the code. Hash-based verification ensures that QR codes cannot be manipulated without detection, providing an additional safeguard against forgery and unauthorized modifications.

The invention further supports centralized validation, enabling businesses, financial institutions, and government entities to register and authenticate QR codes through a secure verification engine. A centralized QR code registry ensures that only authorized entities can issue verified QR codes, preventing unauthorized third parties from generating fraudulent codes. This feature is particularly useful for enterprises that require strict control over QR code issuance, such as banks, payment providers, and government agencies. By integrating with existing enterprise security frameworks, the invention provides a scalable solution for secure QR code management across various industries.

The QR Code Verification Engine is further enhanced by real-time security alerts, which notify users and system administrators when suspicious QR code activity is detected. These alerts provide contextual information about the nature of the threat, including details about the potential tampering, expiration status, and risk level of the QR code. Security teams can use this data to take immediate action against fraudulent activity, ensuring that QR codes remain a trusted and secure method of interaction.

The invention incorporates AI-powered behavioral analysis, which continuously monitors patterns of QR code interactions to detect anomalies indicative of fraudulent activity. By analyzing factors such as scanning frequencies, geolocation patterns, and user behavior, the system identifies potential threats before they result in fraud. This proactive security measure allows businesses to preemptively counteract emerging attack vectors, ensuring that QR code security remains adaptive and resilient. Through this multi-layered approach, the invention revolutionizes QR code security, providing an intelligent, tamper-resistant, and highly secure solution for digital transactions, authentication, and fraud prevention.

In light of the foregoing, the following provides a simplified summary of the present disclosure to offer a basic understanding of its various parts. This summary is not exhaustive, nor does it limit the exemplary aspects of the inventions described herein. It is not designed to identify key or critical elements or steps of the disclosure, nor to define its scope. Rather, it is intended, as understood by a person of ordinary skill in the art, to introduce some concepts of the disclosure in a simplified form as a precursor to the more detailed description that follows. The specification throughout this application contains sufficient written descriptions of the inventions, including exemplary, non-exhaustive, and non-limiting methods and processes for making and using the inventions. These descriptions are presented in full, clear, concise, and exact terms to enable skilled artisans to make and use the inventions without undue experimentation, and they delineate the best mode contemplated for carrying out the inventions.

In some arrangements, a method for verifying and securing a QR code includes receiving, by a QR code generation system, input data for encoding into a QR code, wherein input data comprises transaction details, authentication credentials, or access control parameters associated with a registered user account. The method further includes generating, by the QR code generation system, a visible QR code encoding the input data. A security module of the QR code generation system then embeds a hidden security layer within the QR code using steganographic encoding or invisible watermarking, wherein the hidden security layer comprises encrypted metadata corresponding to the input data. A verification server stores a record of the QR code, including the input data, the hidden security layer, and a cryptographic hash of the QR code. A QR code scanning device receives a scanned QR code from a user interaction and extracts the input data from the scanned QR code. The QR code scanning device further decodes the hidden security layer embedded within the scanned QR code. The verification server validates the scanned QR code by comparing the extracted input data and the decoded hidden security layer with the corresponding stored record.

The verification server determines whether the cryptographic hash of the scanned QR code matches the stored cryptographic hash, thereby detecting unauthorized modifications or tampering. An AI-powered tamper detection module analyzes the scanned QR code for anomalies indicative of fraudulent alterations, wherein the anomalies include pixel distortions, metadata inconsistencies, or unexpected steganographic modifications. The AI-powered tamper detection module determines whether the scanned QR code exhibits a tampering probability exceeding a predefined threshold and flags the scanned QR code as suspicious when the threshold is exceeded. A dynamic QR code engine determines whether the scanned QR code is a dynamically generated QR code and verifies whether the scanned QR code remains valid based on a predefined expiration time, rotation schedule, or user-specific conditions.

A verification server transmits a push notification to a user device requesting confirmation of the scanned QR code's intended action, wherein the push notification contains validation details associated with the QR code. A user approval or rejection of the scanned QR code is received through a secure authentication process on the user device. An access control module prevents execution of an action associated with the scanned QR code when the verification server determines that the cryptographic hash does not match, the AI-powered tamper detection module flags the QR code as suspicious, or the user rejects the push notification request. A browser plugin security module validates a QR code encountered in an online environment, wherein the browser plugin security module scans the QR code embedded in a digital document, email, or webpage and transmits the scanned QR code to the verification server for authentication prior to user interaction. A financial transaction processor determines whether the scanned QR code corresponds to a financial transaction and processes a payment only when the verification server confirms the authenticity of the QR code. An offline authentication module verifies a scanned QR code in an offline environment using an encrypted metadata validation process, wherein the offline authentication module extracts and decodes the embedded security layer from the scanned QR code without requiring network connectivity.

A contextual security module determines whether the scanned QR code meets predefined contextual security criteria, wherein the contextual security criteria include geographic location, user identity, device fingerprinting, or access control rules. A centralized QR code registry logs validation results and security alerts related to the scanned QR code, wherein the centralized QR code registry maintains a record of authenticated QR codes, security incidents, and fraud detection metrics. A behavioral analysis engine analyzes historical QR code interaction data of a user, determines whether the scanned QR code interaction deviates from expected behavioral patterns, and flags the scanned QR code as suspicious when the deviation exceeds a predefined threshold. A verification server generates a security alert when the scanned QR code is determined to be tampered, expired, unregistered, suspicious based on behavioral analysis, or rejected by the user, and transmits the security alert to a security monitoring system or the user device. Execution of any action associated with the scanned QR code is permitted only when the verification server confirms the authenticity of the QR code, the AI-powered tamper detection module does not detect anomalies, the cryptographic hash matches the stored hash, the push notification request is approved by the user, and the contextual security criteria are satisfied.

In some arrangements, the hidden security layer further comprises an encryption key unique to each generated QR code, and the verification server decrypts the hidden security layer using the encryption key prior to performing validation. The encryption key is generated using asymmetric cryptographic techniques, wherein a public-private key pair is used to encrypt and decrypt the hidden security layer to ensure that only the verification server can validate the QR code. The verification server further associates the encryption key with a registered user account, such that only authorized users are able to generate or validate QR codes through the system. The verification server determines whether the scanned QR code is associated with a transaction exceeding a predefined risk threshold, and initiates an additional security measure, comprising a secondary biometric authentication request, when the predefined risk threshold is exceeded. The biometric authentication request requires the user to authenticate using fingerprint recognition, facial recognition, or voice authentication through the user device before validating the scanned QR code. The verification server logs a record of the biometric authentication attempt, including whether the authentication was successful or failed, and the record is stored in the centralized QR code registry for fraud analysis.

In some arrangements, the browser plugin security module determines whether the scanned QR code is embedded in an email, and the verification server scans metadata associated with the email to determine whether the email originates from a trusted sender before validating the QR code. The financial transaction processor determines whether the scanned QR code is associated with a cross-border financial transaction, and the verification server verifies the compliance of the transaction with applicable jurisdictional regulations before approving payment processing. The behavioral analysis engine updates a dynamic fraud risk score associated with the user based on repeated interactions with QR codes, and the verification server modifies the security requirements for future QR code interactions based on the fraud risk score.

In some arrangements, a system for verifying and securing a QR code includes a QR code generation system configured to receive input data for encoding into a QR code, wherein the input data comprises transaction details, authentication credentials, or access control parameters associated with a registered user account. The system further includes a QR code encoding module configured to generate a visible QR code encoding the input data. A security module is configured to embed a hidden security layer within the QR code using steganographic encoding or invisible watermarking, wherein the hidden security layer comprises encrypted metadata corresponding to the input data and an encryption key unique to the generated QR code. The system further includes an encryption module configured to encrypt the hidden security layer using asymmetric cryptographic techniques, wherein a public-private key pair is used to encrypt and decrypt the hidden security layer to ensure that only a verification server can validate the QR code. The verification server stores a record of the QR code including the input data, the hidden security layer, the encryption key, and a cryptographic hash of the QR code, wherein the encryption key is associated with the registered user account.

In some arrangements, the encryption module generates a unique encryption key for each QR code using a quantum-resistant cryptographic algorithm, wherein the cryptographic algorithm comprises lattice-based encryption, hash-based signatures, or post-quantum key exchange methods. The verification server further comprises a multi-factor authentication module configured to require a secondary authentication factor in addition to the biometric authentication request, wherein the secondary authentication factor includes a one-time passcode sent via SMS, email, or an authentication application. The multi-factor authentication module determines an authentication risk level for the scanned QR code based on user behavior patterns, transaction history, and geolocation data, and dynamically adjusts authentication requirements based on the authentication risk level. The behavioral analysis engine further comprises a machine learning model trained to detect anomalies in user QR code interactions, wherein the model uses historical QR code scans, device usage history, and biometric authentication trends to predict potential fraud attempts. The security alert module further comprises an adaptive threat intelligence system configured to categorize security alerts based on severity levels, wherein the severity levels are determined based on real-time fraud analytics, contextual security data, and AI-based risk scoring.

The following description and claims, in conjunction with the drawings-all integral parts of this specification-will clarify various features and characteristics of the current technology. Like reference numerals in the figures correspond to similar parts, enhancing understanding of the technology's methods of operation and the functions of related structural elements, as well as the synergies and economies of their combinations. Some of the processes or procedures described here may be implemented, in whole or in part, as computer-executable instructions recorded on computer-readable media, configured as computer modules, or in other computer constructs. These steps and functionalities may be executed on a single device or distributed across multiple devices interconnected with one another. However, it is important to acknowledge that the drawings primarily serve for descriptive and illustrative purposes and are not intended to delineate the limits of the invention. Unless contextually evident, the singular forms of "a," "an," and "the" used throughout the specification and claims should be interpreted to include their plural counterparts.

BRIEF DESCRIPTION OF DRAWINGS

FIG. 1 is an exemplary system architecture diagram in accordance with one or more embodiments disclosed herein that illustrates a QR Code Verification Engine designed to generate, authenticate, and secure QR codes using multi-layered validation techniques, AI-powered tamper detection, dynamic QR code rotation, and encryption-based security measures. The system integrates QR code generation, verification, transaction processing, biometric authentication, contextual security, and real-time fraud prevention to ensure secure digital interactions and prevent unauthorized access, duplication, or manipulation of QR codes.

FIG. 2 is an exemplary flow diagram in accordance with one or more embodiments disclosed herein that illustrates the step-by-step process of generating, encrypting, verifying, and authenticating a QR code using multi-layered security techniques, including steganographic encoding, cryptographic hashing, AI-powered tamper detection, biometric authentication, and push notification approval. The flow diagram further details the validation and execution process, incorporating transaction risk assessment, offline verification, real-time security alerts, and secure financial processing to ensure QR code integrity and prevent unauthorized access, fraud, or tampering.

FIGS. 3A-3B are collectively an exemplary sequence diagram in accordance with one or more embodiments disclosed herein that illustrates the detailed step-by-step interactions between the user device, QR code generation system, QR code verification system, AI tamper detection system, user authentication system, financial transaction system, and security monitoring system during the process of generating, verifying, authenticating, and executing a QR code transaction. The diagram captures the sequence of operations, including QR code creation with hidden security layers, cryptographic validation, AI-powered tamper detection, biometric authentication, push notification approval, financial transaction processing, and real-time security alerting to ensure secure and tamper-proof interactions.

FIG. 4 is an exemplary class diagram in accordance with one or more embodiments disclosed herein that illustrates the structural organization and relationships between the core components of the QR Code Verification Engine, including QR code generation, verification, authentication, transaction processing, and security monitoring. The diagram defines the attributes and methods of each class, demonstrating how components such as the QR Code Generation System, QR Code Verification System, AI Tamper Detection System, User Authentication System, Financial Transaction System, and Security Monitoring System interact to ensure secure QR code-based transactions and prevent fraud.

DETAILED DESCRIPTION

The invention is a QR Code Verification Engine that provides a multi-layered security framework designed to generate, validate, and authenticate QR codes while simultaneously preventing tampering, unauthorized access, fraud, and phishing attacks. QR codes have become an essential tool for digital transactions, identity verification, access control, and other authentication-based processes due to their simplicity and ease of use. However, the widespread adoption of QR codes has introduced significant security risks, as existing QR code systems do not have adequate mechanisms to prevent unauthorized modifications, redirection attacks, or fraudulent replication. Malicious actors can tamper with QR codes to redirect users to harmful websites, inject fraudulent payment details, or manipulate authentication credentials without the user's knowledge. The invention directly addresses these vulnerabilities by integrating multiple layers of security, including encryption, steganographic security layers, cryptographic hashing, AI-powered tamper detection, biometric authentication, push notification-based transaction approvals, contextual security analysis, and offline verification capabilities, ensuring that QR codes remain secure, trustworthy, and resistant to attack.

The QR Code Generation System is responsible for securely creating QR codes that incorporate both visible and hidden security elements. When a QR code is generated, the system receives input data such as transaction details, authentication credentials, access control parameters, or any other encoded information. This input data is then processed and structured within a scannable QR code format. Unlike conventional QR code generation methods that simply encode visible data, this system embeds a hidden security layer using advanced steganographic encoding techniques or invisible watermarking. This hidden layer is imperceptible to the human eye and standard QR code scanners but can be extracted and validated by the QR Code Verification System. To further enhance security, the hidden security layer is encrypted using asymmetric cryptographic techniques such as public-private key cryptography. This ensures that even if an unauthorized party gains access to the QR code, they will be unable to extract or manipulate the hidden security layer without the appropriate decryption key.

To provide an additional layer of integrity verification, a cryptographic hash is computed at the time of QR code generation. This cryptographic hash serves as a unique fingerprint for the QR code and its associated metadata. When the QR code is later scanned for validation, the system can recalculate the hash and compare it against the stored reference value. If any portion of the QR code, whether visible or hidden, has been altered, the hash verification process will immediately detect the discrepancy and flag the QR code as potentially compromised. The system also determines whether a QR code should be static or dynamic. A static QR code retains its original data indefinitely, while a dynamic QR code is configured to change or expire based on predefined security parameters. Dynamic QR codes prevent unauthorized reuse by implementing expiration times, rotation mechanisms, and user-specific authentication conditions. This ensures that a QR code cannot be copied or replicated for fraudulent purposes after its intended use.

Once a QR code has been generated, all associated metadata, including encryption keys, cryptographic hashes, expiration rules, and security conditions, is securely stored in a centralized database for future validation. When a user interacts with the QR code, the verification process is initiated by scanning the QR code and transmitting it to the QR Code Verification System. The verification system extracts both the visible QR code data and the hidden security layer, decrypting the embedded metadata and ensuring that it remains intact. This extracted data is then cross-referenced with the original metadata stored in the database. If any discrepancies exist between the scanned QR code and the stored reference data, the system flags the QR code as potentially fraudulent and applies additional security measures before allowing the transaction to proceed.

To further safeguard against fraudulent QR code manipulations, the system employs an AI-powered tamper detection module. This module utilizes machine learning algorithms and pattern recognition techniques to analyze QR codes for subtle distortions, pixel-level anomalies, metadata inconsistencies, and steganographic manipulations that may indicate tampering. The AI system assigns a tampering probability score to each scanned QR code based on the severity and nature of detected anomalies. If the AI-powered tamper detection module determines that a QR code has been altered beyond an acceptable threshold, the QR Code Verification System blocks the transaction and generates an automated security alert for further investigation.

Beyond tamper detection, the system incorporates multiple layers of authentication based on contextual risk assessments. If a scanned QR code is associated with a high-risk transaction, additional authentication measures are required to ensure the legitimacy of the transaction before it is executed. For example, the system may initiate biometric authentication, requiring the user to verify their identity using fingerprint recognition, facial recognition, or voice authentication before the transaction can proceed. This ensures that even if a malicious actor gains access to a valid QR code, they cannot execute unauthorized transactions without successfully passing biometric authentication. In addition to biometric authentication, the system also implements a push notification approval mechanism that allows users to manually confirm or reject QR code-based transactions. When a QR code is scanned, instead of immediately executing the embedded action, the system sends a push notification to the user's registered mobile device. The user must manually approve the transaction by responding to the notification. If the user denies the request, the QR code action is rejected, preventing unauthorized transactions from occurring.

For financial transactions, the QR Code Verification System integrates with banking networks and payment processing systems to ensure that QR code-based payments are executed securely and in compliance with industry standards. When a QR code transaction request is received, the system validates the transaction metadata, verifies the recipient details, checks for potential fraud indicators, and ensures compliance with security regulations before processing the payment. If any irregularities are detected, the transaction is halted, and the user is notified. The system also supports offline verification, enabling QR codes to be validated in environments with limited or no internet connectivity. Offline authentication is achieved by leveraging pre-stored encrypted metadata within the QR code itself, allowing the system to verify the QR code's integrity even without real-time access to the centralized verification server.

To enhance security in digital environments, the system includes a browser plugin that scans and verifies QR codes embedded in emails, websites, and digital documents before allowing user interaction. This prevents users from inadvertently engaging with fraudulent QR codes that could redirect them to phishing sites or malicious downloads. The system's email security module further enhances protection by determining whether QR codes embedded in email communications originate from a trusted source before allowing users to interact with them.

The system also implements contextual security measures to ensure that QR code interactions are appropriate based on various environmental factors. Context-aware validation techniques analyze user identity, geographic location, I device fingerprinting, and access control conditions before allowing a QR code action to be executed. Additionally, a behavioral analysis engine continuously monitors QR code interactions, detecting deviations from expected usage patterns that may indicate potential fraud or unauthorized activity.

All QR code interactions and security events are logged in a centralized security monitoring system. This system maintains a comprehensive record of validation results, authentication outcomes, detected anomalies, and security incidents. If fraudulent activity is detected at any stage of the verification process, the system generates a real-time security alert and notifies the appropriate monitoring entity for immediate intervention. This proactive security approach allows organizations to analyze potential threats, conduct forensic investigations, and implement countermeasures to prevent future attacks.

To future-proof the QR Code Verification Engine, the system incorporates post-quantum cryptographic techniques such as lattice-based encryption, hash-based signatures, and quantum-resistant key exchange mechanisms. These encryption techniques ensure that QR codes remain resistant to decryption by quantum computing threats, providing long-term security against emerging cryptographic vulnerabilities.

The QR Code Verification Engine is designed to integrate seamlessly into various industries and applications. In the financial sector, the system ensures that QR codes used for payment processing remain secure and resistant to fraud. For identity verification applications, the system enhances authentication security by requiring multi-factor authentication before granting access. In digital marketing, the system helps businesses protect their brand by embedding hidden authentication metadata into QR codes, preventing unauthorized tampering in advertisements and promotions.

By providing a multi-layered security framework, the QR Code Verification Engine significantly enhances trust in QR code-based transactions and interactions. Users benefit from robust protection against phishing attacks, malicious redirection attempts, unauthorized modifications, and fraudulent QR code reproductions. The seamless integration of AI-driven tamper detection, encryption, biometric authentication, contextual validation, and real-time fraud monitoring provides an unprecedented level of security for QR code-based interactions.

The system is designed to proactively detect and prevent fraud rather than merely reacting to security breaches after they occur. By requiring multiple layers of verification, including biometric authentication, push notification approval, cryptographic validation, and AI-driven anomaly detection, the system ensures that even if one security layer is compromised, additional safeguards prevent unauthorized transactions or fraudulent activities. This comprehensive approach makes the QR Code Verification Engine one of the most advanced and reliable QR code security solutions available, capable of safeguarding sensitive transactions, access control mechanisms, and identity verification processes across a wide range of industries and applications.

The description of various example embodiments herein is intended to achieve the goals previously outlined, referencing the illustrations included in this disclosure. These illustrations depict multiple systems and methods for implementing the disclosed information. It should be recognized that alternative implementations are possible, and modifications to both structure and functionality may be made. The description details various connections between elements, which should be interpreted broadly. Unless explicitly stated otherwise, these connections can be either direct or indirect and may be established through either wired or wireless methods. This document does not aim to restrict the nature of these connections.

In various configurations, terms such as "computers" and "machines" refer to devices that may be general-purpose or specialized for specific tasks, whether physical or virtual, and capable of network connectivity. These devices encompass all necessary hardware, software, and components known to skilled practitioners, including application-specific integrated circuits (ASICs), microprocessors, cores, or other processing units. These components execute, control, or implement various types of software, instructions, data, modules, processes, or routines. The terms used do not restrict the device type and should be broadly interpreted. Software, data, and executable code can reside on various physical, computer-readable storage devices, such as local memory, cloud-based storage, or network-attached storage. These can be stored in both volatile and non-volatile memory and may function autonomously or respond to specific triggers. These elements can be consolidated or distributed across multiple devices and stored in accessible memory systems such as distributed databases, big data infrastructures, blockchains, or distributed ledgers.

Networks and similar references refer to a broad range of communication systems, from local area networks (LANs) and wide area networks (WANs) to the Internet and cloud-based networks, supporting wired and wireless configurations. Specialized networks like digital subscriber line (DSL), frame relay, asynchronous transfer mode (ATM), and virtual private networks (VPN) are included. These networks utilize various hardware and software components, including modems, routers, firewalls, switches, and adapters, to facilitate communication. Networks are also equipped with virtual IP addresses and support multiple protocols like HTTPS, enabling effective packet-based data transmission and communication.

Generative Artificial Intelligence (AI) refers to AI techniques that learn from training data and generate new content, such as text, code, images, and audio. Generative AI systems, often powered by large language models (LLMs) like GPT-3, GPT-4, Meta LLaMA, and others, can be deployed through APIs, search engines, or chatbots. These models, which may be proprietary or open source, leverage deep learning methods and are generally governed by enterprise policies regarding AI and risk. Models such as BERT, T5, AlphaFold, Watson, Megatron, and others play a role in generating or interpreting language and content for various applications.

Generative AI and LLMs are utilized throughout this disclosure for tasks including natural language processing, data analysis, real-time processing, software development, and creative content generation. Specific functions include trend analysis, data classification, sentiment analysis, writing assistance, language translation, and decision-making support. These models enable capabilities like feedback learning, context determination, and comprehensive search operations, improving performance through iterative learning and feedback from human or system interactions. The wide range of applications supported by generative AI makes these systems a powerful tool in generating, analyzing, and managing information across diverse fields. All configurations and uses of these models are within the scope of this disclosure.

FIG. 1 is an exemplary system architecture diagram in accordance with one or more embodiments disclosed herein that illustrates a QR Code Verification Engine designed to generate, authenticate, and secure QR codes using multi-layered validation techniques, AI-powered tamper detection, dynamic QR code rotation, and encryption-based security measures. The system integrates QR code generation, verification, transaction processing, biometric authentication, contextual security, and real-time fraud prevention to ensure secure digital interactions and prevent unauthorized access, duplication, or manipulation of QR codes.

The system architecture of the QR Code Verification Engine is designed to provide a highly secure, multi-layered framework for generating, validating, and authenticating QR codes while mitigating security risks such as fraud, tampering, unauthorized access, and phishing attacks. The QR Code Generation System, including the QR Code Generator (100), serves as the foundation of the entire process, enabling the secure creation of QR codes that incorporate various advanced security measures. Within this system, the QR Code Encoding Module (102) generates the visible QR code that encodes specific input data such as transaction details, authentication credentials, or access control parameters. The QR codes produced by this module are essential for enabling secure interactions across digital and physical environments, including financial transactions, identity verification, and restricted-access systems.

To enhance security and prevent malicious tampering, the Security Module (104) embeds a hidden security layer within the QR code, utilizing steganographic encoding or invisible watermarking techniques. This hidden layer, which is imperceptible to the human eye but detectable by the QR Code Verification System (112), ensures that any modification or duplication attempt is immediately flagged during validation.

To enhance security and prevent malicious tampering, the Security Module embeds a hidden security layer within the QR code by utilizing steganographic encoding or invisible watermarking techniques. This hidden layer is imperceptible to the human eye and does not interfere with the QR code's readability by standard scanners. However, it can be extracted and validated by the QR Code Verification System to ensure the authenticity and integrity of the QR code. The process of embedding this hidden security layer involves encoding security data such as unique identifiers, cryptographic hashes, time-stamped validation keys, user authentication metadata, or transaction-specific information. This security data is then embedded within the QR code structure in a way that does not alter its outward appearance but makes it detectable by specialized verification systems.

Steganographic encoding techniques modify certain patterns within the QR code's background, error correction regions, or pixel distributions to embed security data. The modifications are subtle enough to remain undetectable to standard QR code readers while allowing the verification system to extract and validate the embedded information. One approach involves using least significant bit encoding, which modifies the least significant bits of pixel intensities to embed the hidden security layer without affecting the overall QR code structure. Another approach uses spread-spectrum watermarking, where the security data is embedded across the QR code in a manner that distributes the information over a wider range of pixels, making it more resilient to tampering. Color pattern modulation can also be used, where slight variations in grayscale or color intensity carry the hidden security information.

Invisible watermarking techniques provide an additional layer of security by embedding imperceptible patterns, microtext, or frequency-based watermarks into the QR code. These watermarks are embedded using frequency-domain transformations such as Discrete Fourier Transform or Discrete Wavelet Transform, ensuring that they remain intact even if the QR code undergoes resizing, compression, or other distortions. Unlike visual modifications, these watermarks require specialized algorithms for extraction, making them more resistant to tampering. The QR code remains visually unchanged to users, but any attempt to alter its structure disrupts the embedded watermark, leading to an immediate detection of tampering by the verification system.

To further enhance the security of the hidden layer, the embedded security data undergoes encryption before being incorporated into the QR code. Encryption ensures that even if an unauthorized party gains access to the QR code, they cannot extract or modify the hidden security layer without the correct decryption key. The system generates a public-private key pair for asymmetric encryption or a symmetric key for lightweight encryption. The security module encrypts the hidden layer data using strong encryption algorithms such as Advanced Encryption Standard 256-bit encryption or RSA 2048-bit encryption. This encrypted data is then embedded using steganographic or watermarking techniques to ensure that only the intended verification system can decrypt and authenticate it.

Once the security layer is embedded, the QR code is generated and stored along with its metadata in a centralized database. This metadata includes encryption keys, cryptographic hash values, expiration timestamps, and security policies that define how the QR code should be validated. If a user scans the QR code, the verification process begins by extracting and decrypting the hidden security layer. The QR Code Verification System applies inverse steganographic extraction or digital watermark detection techniques to retrieve the hidden data. Using the private key or symmetric decryption key, the system decrypts the extracted data and compares it against the reference data stored in the centralized database. If the extracted security data does not match the stored metadata, the QR code is flagged as compromised, preventing fraudulent transactions or unauthorized access.

To further strengthen the verification process, the system performs cryptographic hash integrity checks to detect unauthorized modifications. A cryptographic hash of the original QR code is stored at the time of its generation. When the QR code is later scanned, the system recomputes the hash and compares it against the stored reference value. Any alteration to the QR code's structure, whether in the visible or hidden layers, results in a hash mismatch, triggering an alert. Additionally, the verification system employs an AI-powered tamper detection module that analyzes the scanned QR code for anomalies. Machine learning algorithms are used to identify pixel distortions, metadata inconsistencies, or steganographic anomalies that may indicate tampering attempts.

The QR code verification system also implements contextual authentication measures to assess transaction risk before approving QR code-based actions. If the system determines that a transaction is high-risk, additional authentication measures are triggered. Biometric authentication, such as fingerprint recognition, facial recognition, or voice authentication, may be required to verify the user's identity before allowing the QR code transaction to proceed. The system may also implement push notification approval, where a notification is sent to the user's registered device, requiring manual confirmation before executing the QR code action. If the user denies the request, the QR code action is rejected, preventing unauthorized transactions.

For financial transactions, the QR code verification system integrates with banking networks and payment processing platforms to ensure secure and fraud-resistant payments. When a QR code is used for payment processing, the system validates the metadata, verifies recipient details, checks for potential fraud indicators, and ensures compliance with financial security regulations before executing the transaction. If any irregularities are detected, the system blocks the transaction and notifies the user. Additionally, the system supports offline verification, allowing QR codes to be authenticated even in environments with limited or no internet connectivity. Offline authentication is achieved by embedding pre-stored encrypted metadata within the QR code itself, enabling the system to verify its integrity without requiring real-time access to the centralized verification server.

The QR Code Verification System also includes a browser plugin that scans and verifies QR codes embedded in emails, websites, and documents before allowing user interaction. This feature prevents users from engaging with fraudulent QR codes that could redirect them to phishing sites or download malware onto their devices. Additionally, the system's email security module assesses QR codes in electronic communications to determine whether they originate from a trusted sender before allowing interaction. By implementing these security measures, the system prevents social engineering attacks that exploit QR code vulnerabilities.

To enhance security further, the verification system employs a real-time logging and alerting mechanism that records all QR code interactions and security events. A centralized security monitoring system maintains a detailed record of validation results, authentication attempts, detected anomalies, and potential security breaches. If fraudulent activity is detected, the system generates an immediate security alert and notifies the appropriate monitoring entity for further investigation. These logs also provide valuable forensic data for fraud analysis and compliance audits.

The QR code security framework is designed to resist various attack scenarios. It prevents cloning attacks by embedding encrypted security data that is dynamically validated against server-side records. Any copied QR code that does not contain the correct encrypted metadata fails verification. The system also prevents pixel modification attacks by analyzing the QR code's digital signature and structure for subtle alterations. If any modification is detected, the QR code is flagged as compromised. Additionally, replay attack prevention is achieved by assigning expiration timestamps to QR codes, ensuring that they cannot be reused after their validity period has expired.

To future-proof QR code security, the system incorporates post-quantum cryptographic techniques such as lattice-based encryption, hash-based signatures, and quantum-resistant key exchange protocols. These advanced encryption techniques safeguard QR codes against future threats posed by quantum computing, ensuring that they remain secure as cryptographic technologies evolve. This proactive approach prevents attackers from decrypting QR code security layers using quantum-based attacks.

By combining encryption, steganographic encoding, AI-powered tamper detection, biometric authentication, contextual validation, and real-time fraud detection, the QR Code Verification Engine provides an advanced security solution for QR code interactions. The system ensures that QR codes remain a secure and trusted mechanism for digital transactions, identity verification, access control, and other authentication-based processes. This multi-layered security approach significantly enhances trust in QR codes while mitigating risks associated with tampering, phishing, and unauthorized modifications.

The Encryption Module (106) is responsible for encrypting this hidden security layer using asymmetric cryptographic techniques such as public-private key pairs. This encryption process guarantees that only authorized verification systems can decrypt and authenticate the embedded security data, ensuring that attackers cannot alter the QR code's integrity without detection. Once a QR code is generated, all relevant data, including the input information, encryption key, cryptographic hash, and timestamp of generation, is securely stored within the QR Code Metadata Storage (108). This storage component acts as a centralized repository for all generated QR codes, allowing for real-time validation and ensuring that QR code data remains secure and immutable.

To further mitigate risks associated with unauthorized reuse and duplication of QR codes, the Dynamic QR Code Engine (110) generates QR codes that are dynamic in nature, meaning they rotate, expire, or update based on predefined security conditions. This functionality prevents QR codes from being copied and reused for fraudulent purposes. For example, in the context of financial transactions, a dynamic QR code could be programmed to regenerate every 60 seconds, ensuring that each instance is unique and cannot be intercepted and reused by malicious actors. Similarly, for access control purposes, a dynamic QR code may be valid for a limited timeframe or restricted to a specific location, preventing unauthorized access by individuals who attempt to use expired or copied QR codes.

Once a QR code is scanned, it is transmitted to the QR Code Verification System (112), which is responsible for verifying its authenticity and ensuring that it has not been altered or compromised. The Verification Server (112) acts as the central component that orchestrates the validation process. The Validation Module (114) is the first step in the verification process, extracting both the visible data and the hidden security layer from the scanned QR code and comparing them against the corresponding records stored in the QR Code Metadata Storage (108). If the extracted data does not match the original records, the QR code is flagged as suspicious and rejected.

To further validate the integrity of the scanned QR code, the Hash Verification Module (116) computes the cryptographic hash of the QR code and compares it against the stored reference. If there is any discrepancy between the computed hash and the stored hash, this indicates that the QR code has been modified, and the verification process is halted immediately. In addition to traditional validation methods, the AI-Powered Tamper Detection Module (118) utilizes advanced machine learning algorithms and pattern recognition techniques to analyze the QR code for signs of tampering. This module detects subtle anomalies such as pixel distortions, steganographic inconsistencies, or unexpected modifications that may indicate that the QR code has been altered in a way that is not visible to the naked eye. If the AI-Powered Tamper Detection Module (118) determines that tampering has occurred, the Tampering Determination Module (120) calculates a probability score based on the severity of detected anomalies. If the probability of tampering exceeds a predefined threshold, the QR code is flagged as suspicious and is either rejected or subjected to additional security measures.

To enhance security further, the system incorporates multiple authentication mechanisms that assess transaction risk and prevent unauthorized interactions with QR codes. The Risk Assessment Module (122) evaluates whether a scanned QR code is associated with a high-risk transaction or security-sensitive event. If the system detects an elevated risk level, the Biometric Authentication Module (124) enforces additional identity verification through biometric authentication methods such as fingerprint recognition, facial recognition, or voice authentication. This ensures that even if an attacker gains access to a valid QR code, they will be unable to complete the associated transaction or authentication process without successfully passing biometric authentication.

To ensure that users remain in control of QR code interactions, the Push Notification Verification Module (126) introduces an additional layer of security by sending a secure push notification to the user's registered mobile device whenever a QR code is scanned. Instead of executing the QR code action immediately, the system requires the user to manually approve or deny the request through their mobile device. The User Response Module (128) captures the user's decision and transmits it back to the QR Code Verification System (112). If the user denies the request, the Access Control Module (130) prevents the QR code-based action from being executed, ensuring that unauthorized transactions or fraudulent interactions cannot occur.

In financial and transactional contexts, the Financial Transaction Processor (132) ensures that QR codes used for payments and fund transfers are authenticated before processing. This component integrates with banking networks and digital payment platforms to ensure that transactions are securely validated. Additionally, the Cross-Border Compliance Module (134) ensures that QR code-based transactions comply with international regulatory frameworks before they are approved. The system also includes an Offline Authentication Module (136), which allows QR codes to be verified in environments with limited or no internet connectivity. This module extracts and decodes the encrypted security layer from the QR code without requiring an active network connection, making it suitable for use in secure facilities, transportation hubs, and remote locations.

To protect users from malicious QR codes encountered in digital environments, the Browser Plugin Security Module (138) scans and verifies QR codes embedded in emails, websites, and online documents before allowing the user to interact with them. The Email Security Module (140) evaluates whether an email or document containing a QR code originates from a trusted sender. If an unverified or suspicious sender is detected, the system issues a warning to the user and prevents interaction with the QR code.

The system also incorporates contextual security measures to ensure that QR codes are used appropriately based on environmental factors. The Contextual Security Module (142) applies predefined security rules based on user identity, geographic location, device fingerprinting, and access control conditions. The Behavioral Analysis Engine (144) continuously monitors QR code interactions and analyzes user behavior to detect anomalies. If a deviation from normal behavior is detected, the Fraud Risk Management Module (146) updates the user's dynamic fraud risk score and adjusts the security requirements for future QR code interactions accordingly.

To ensure comprehensive security logging and monitoring, the Centralized QR Code Registry (148) maintains detailed records of all QR code transactions and validation results. The Audit Logging Module (150) securely logs all QR code interactions, including timestamps, authentication outcomes, and biometric validation attempts. If a QR code is determined to be compromised, expired, unregistered, or fraudulent, the Security Alert Module (152) generates a real-time alert and notifies the appropriate security monitoring system or the affected user. The Adaptive Threat Intelligence System (154) enhances security by categorizing threats based on risk levels, leveraging AI-driven analytics to prioritize critical security incidents and recommend appropriate mitigation actions.

To future-proof QR code security against emerging cryptographic threats, the Quantum-Resistant Encryption Module (156) employs advanced encryption methods such as lattice-based encryption, hash-based signatures, and post-quantum key exchange protocols. These techniques ensure that QR codes remain resistant to decryption attempts by quantum computing technologies.

The architecture is designed as a fully integrated ecosystem where each component plays a role in securing QR codes throughout their lifecycle, from generation to validation and authentication. By incorporating a combination of encryption, AI-driven analysis, biometric authentication, push notifications, offline verification, and real-time security alerts, the QR Code Verification Engine provides an unparalleled level of protection against fraud and tampering. This system is capable of supporting diverse use cases, including secure financial transactions, identity verification, digital access control, and online authentication, ensuring that QR codes remain a trusted and secure mechanism in digital and physical interactions.

FIG. 2 is an exemplary flow diagram in accordance with one or more embodiments disclosed herein that illustrates the step-by-step operation of the QR Code Verification Engine, beginning with the generation of a QR code and progressing through multiple security checks, authentication processes, transaction risk assessments, and ultimate execution or rejection of the QR code action. The process begins when the system receives input data for QR code generation, where the input data may consist of transaction details, authentication credentials, or access control parameters provided by a user or system (200). Once the input data is received, the system generates a visible QR code that encodes this data, which is meant for user interaction through a scanning device (202). To enhance security, the system embeds a hidden security layer within the QR code using steganographic encoding or invisible watermarking, ensuring that unauthorized modifications to the QR code will be detectable upon verification (204).

The hidden security layer is then encrypted using asymmetric cryptographic techniques, such as a public-private key pair, ensuring that only authorized verification systems can decrypt and authenticate the embedded security data, which prevents attackers from extracting or modifying hidden security elements (206). Following this, the system generates a cryptographic hash of the entire QR code, including both the visible and hidden layers, creating a unique digital fingerprint that serves as a reference for future validation and ensures that any alterations to the QR code can be immediately detected (208). The system then stores the QR code and its associated metadata, including the input data, hidden security layer, cryptographic hash, encryption key, and timestamp of generation, in a centralized QR code metadata storage database, ensuring that all necessary information is available for future verification requests (210).

At this stage, the system determines whether the QR code is static or dynamic, meaning it checks if the QR code will remain unchanged over time or whether it will have a dynamic property such as expiration or rotation (212). If the QR code is dynamic, the system proceeds to generate dynamic QR code rules, defining conditions such as expiration time, frequency of rotation, and user-specific security settings, which are implemented to enhance security and prevent unauthorized reuse of QR codes (214). If the QR code is determined to be static or once the dynamic rules have been generated, the system transmits the finalized QR code to the user, making it available for display, transaction processing, authentication, or access control purposes (216).

Once the QR code has been generated and made available, the system receives a scanned QR code for verification when a user or device interacts with it (218). Upon receiving the scanned QR code, the system extracts the input data and the hidden security layer embedded within the QR code for validation (220). To ensure that the scanned QR code is legitimate, the system retrieves the stored metadata associated with the QR code from the centralized database, including the original cryptographic hash, security layer, and encryption details (222). The first verification step consists of validating the visible QR code data by comparing the extracted input data against the stored metadata, ensuring that no alterations have been made to the publicly visible portion of the QR code (224). The system then proceeds to decrypt the hidden security layer using the corresponding encryption key retrieved from the database, which ensures that only authorized entities can validate the hidden security information (226). The decrypted hidden security layer is then compared against the stored security metadata to confirm that no unauthorized modifications have occurred (228).

Following the validation of both the visible and hidden data, the system performs a hash integrity check, where the cryptographic hash of the scanned QR code is recalculated and compared against the stored hash to detect any unauthorized changes to the QR code's structure or data (230). To further ensure the security of the QR code, the system employs an AI-powered tamper detection module that utilizes machine learning and pattern recognition to analyze the scanned QR code for any signs of manipulation, such as pixel distortions, steganographic inconsistencies, or unexpected modifications that may indicate fraudulent activity (232). The AI model then determines a probability score that represents the likelihood that the QR code has been tampered with (234). If this probability score exceeds a predefined security threshold, the system flags the QR code as suspicious and prevents any further processing, ensuring that tampered QR codes are not used for fraudulent purposes (236).

The system then checks whether the QR code has expired based on its predefined expiration time or dynamic rotation rules (240). If the QR code has expired, it is immediately rejected, and the user is notified that the code is no longer valid (242). If the QR code is still valid, the system proceeds to assess the transaction risk associated with the scanned QR code, determining whether additional security measures should be applied based on the type of transaction and the level of associated risk (244). If the transaction is classified as high-risk, the system determines whether additional authentication is required before proceeding (246). If additional authentication is necessary, the system triggers a biometric authentication process, requiring the user to verify their identity using fingerprint recognition, facial recognition, or voice authentication (248). The biometric authentication module then verifies the user's identity and transmits the result to the verification system (250).

If all previous validation checks are successful, the system proceeds to validate the QR code action, preparing to execute the corresponding function, such as completing a transaction, granting access, or verifying identity (252). Before the action is executed, the system sends a push notification to the user's registered mobile device, requesting explicit user approval before proceeding with the QR code interaction (254). The system then waits for the user to approve or reject the request, capturing their response through a secure authentication process (256). If the user denies the request, the system rejects the QR code action and prevents any further execution (260). If the user approves the request, the system proceeds to execute the QR code action, completing the intended function (262).

If the QR code corresponds to a financial transaction, the system determines whether payment processing is required (264). If the transaction is financial, the system securely processes the payment through a secure channel, ensuring that funds are only transferred to the intended recipient and that all security measures are in place to prevent fraud (266). The system also determines whether the QR code is being processed in an offline environment, where internet connectivity may be unavailable (268). If the transaction is occurring in an offline environment, the system performs offline verification by extracting and decrypting the embedded security layer using pre-stored metadata without requiring network access, ensuring that authentication can still be conducted securely (270).

Regardless of the type of transaction or authentication process, the system logs all QR code transactions and security events in a centralized QR code registry, maintaining a detailed record of all interactions, including timestamps, validation results, authentication outcomes, and any detected anomalies (272). If any security threats are identified, such as tampering, unauthorized access attempts, or rejected biometric verification, the system generates a real-time security alert and transmits it to the appropriate security monitoring entity or administrator (274). Once the verification process is completed, the system resets and prepares to handle the next QR code verification request, ensuring continuous operation and security monitoring (276).

This flow diagram provides a comprehensive and detailed representation of how the QR Code Verification Engine operates from the initial generation of a QR code through the verification, authentication, and final execution or rejection of QR code actions. By incorporating multiple layers of security, including encryption, AI-powered tamper detection, biometric authentication, dynamic expiration rules, push notification verification, offline validation, and real-time security alerts, the system ensures that QR codes remain a secure and trusted mechanism for financial transactions, identity verification, access control, and digital authentication. The seamless integration of these security measures allows the system to detect and prevent fraudulent activities while maintaining a streamlined and user-friendly experience.

FIGS. 3A-3B collectively constitute an exemplary sequence diagram in accordance with one or more embodiments disclosed herein that illustrates the detailed interactions between various system components during the generation, verification, authentication, and execution of a QR code transaction. The sequence begins when a user initiates a QR code generation request by providing input data, which may include transaction details, authentication credentials, or access control parameters. This request is sent from the user device to the QR Code Generation System (300). Upon receiving the request, the QR Code Generation System processes the input data and prepares to generate a new QR code (302). The system then creates a visible QR code that encodes the provided input data, ensuring that the fundamental information required for the transaction or authentication is readily available in a scannable format (304). To enhance security and prevent unauthorized alterations, the QR Code Generation System embeds a hidden security layer within the QR code. This layer is implemented using steganographic encoding or invisible watermarking, making it imperceptible to the human eye while still verifiable by the QR Code Verification System (306).

Following the embedding of the hidden security layer, the QR Code Generation System applies asymmetric cryptographic techniques to encrypt this hidden security layer, ensuring that only authorized verification systems can access and validate the embedded data (308). Once encrypted, the system generates a cryptographic hash of the QR code, which serves as a digital fingerprint that uniquely identifies the QR code's data and structure. This cryptographic hash is essential for detecting any modifications to the QR code during the verification process (310). After completing the QR code generation process, the QR Code Generation System transmits the QR code and its associated metadata, including the cryptographic hash, to the QR Code Metadata Storage, where it is securely stored for future reference and validation (312). At this stage, the system evaluates whether the QR code should be static or dynamic (314). If the QR code is dynamic, the system assigns predefined expiration times, rotation frequencies, or user-specific security rules to ensure that the QR code remains valid only under specific conditions, thereby preventing unauthorized reuse or replication (316). Once all QR code attributes are established, the QR Code Generation System transmits the finalized QR code to the user device for display or use in a transaction (318).

When a user interacts with the QR code, the user device scans it and submits it to the QR Code Verification System for authentication (320). The QR Code Verification System receives the scanned QR code and begins processing the data to determine its validity (322). The system extracts both the visible QR code data and the hidden security layer, ensuring that all encoded elements are available for analysis (324). To verify the authenticity of the QR code, the system queries the QR Code Metadata Storage and retrieves the stored metadata associated with the QR code, including its cryptographic hash and security details (326). The QR Code Metadata Storage responds by returning the requested metadata, which serves as the reference for comparison during verification (328). Using this information, the QR Code Verification System first validates the visible QR code data by comparing it against the retrieved metadata to confirm that it has not been altered (330). It then proceeds to decrypt the hidden security layer using the corresponding encryption key from the stored metadata, ensuring that unauthorized users cannot tamper with or extract sensitive security information (332). Once decrypted, the hidden security layer is analyzed and compared against the stored security metadata to confirm that it remains intact and unmodified (334).

To further ensure the integrity of the QR code, the QR Code Verification System performs a cryptographic hash integrity check by recomputing the cryptographic hash of the scanned QR code and comparing it to the stored hash value (336). This process detects any unauthorized modifications by verifying whether the structure of the QR code has changed since its creation. The QR Code Verification System then transmits the extracted QR code details to the AI Tamper Detection System for further anomaly analysis (338). The AI Tamper Detection System applies machine learning and pattern recognition techniques to assess the QR code for manipulation, identifying any pixel distortions, metadata inconsistencies, or hidden modifications indicative of tampering (340). Once the analysis is complete, the AI Tamper Detection System determines a tampering probability score, quantifying the likelihood that the QR code has been altered (342). The system returns this tampering probability score to the QR Code Verification System, which uses it to make further security determinations (344).

The QR Code Verification System checks whether the tampering probability exceeds a predefined security threshold (346). If the score is above the threshold, the QR code is flagged as suspicious, and the system prevents further processing, ensuring that fraudulent QR codes cannot be used (348). If tampering is not detected, the system proceeds to assess the transaction risk associated with the scanned QR code (350). Based on the transaction parameters and user profile, the system evaluates whether additional authentication measures are necessary to verify the user's identity (352). If the transaction is classified as high-risk, the QR Code Verification System initiates biometric authentication by sending a request to the User Authentication System (354). The User Authentication System prompts the user to verify their identity using fingerprint recognition, facial recognition, or voice authentication (356). Once biometric authentication is completed, the User Authentication System returns the authentication result to the QR Code Verification System, confirming whether the user has been successfully verified (358).

As an additional security measure, the QR Code Verification System sends a push notification to the user's registered mobile device, requesting explicit approval before executing the QR code transaction (360). The user responds to the push notification, either approving or rejecting the QR code action (362). The QR Code Verification System processes the user's response, verifying whether the request has been approved or denied (364). If the user rejects the request, the system invalidates the QR code and prevents any further processing (366). If the user approves the request, the QR Code Verification System proceeds to execute the QR code action, which may involve completing a transaction, granting access, or verifying identity (368).

If the QR code corresponds to a financial transaction, the QR Code Verification System sends a transaction request to the Financial Transaction System for processing (370). The Financial Transaction System securely processes the payment, ensuring that the funds are transferred only to the intended recipient, while implementing fraud prevention measures to protect against unauthorized transactions (372). Once the payment is completed, the Financial Transaction System returns the transaction status to the QR Code Verification System, confirming whether the payment was successful (374). Additionally, the QR Code Verification System logs all QR code validation results and authentication outcomes in the Security Monitoring System, maintaining a detailed record of all interactions for auditing and security analysis (376). If any security threats are detected during this process, the Security Monitoring System generates a real-time security alert and transmits it to the appropriate security teams or administrators for immediate action (378). Finally, the QR Code Verification System completes the transaction, finalizes all security checks, and returns the verification result to the user device, ensuring a secure and seamless interaction with the QR code (380).

This sequence diagram illustrates the detailed step-by-step process of generating, verifying, authenticating, and executing QR code transactions while incorporating multiple layers of security, including encryption, AI-powered tamper detection, biometric authentication, dynamic expiration rules, push notification verification, and secure financial processing. By integrating these security measures, the system ensures that QR codes remain a reliable and tamper-proof mechanism for secure transactions, identity verification, and access control across various digital and physical applications.

FIG. 4 is an exemplary class diagram in accordance with one or more embodiments disclosed herein that illustrates the structural organization of the QR Code Verification Engine, defining the relationships between various components, their attributes, and the methods they implement to facilitate secure QR code generation, validation, authentication, transaction processing, and security monitoring.

The class diagram consists of multiple interrelated classes, each responsible for specific tasks within the system. The QR Code Generation System (400) is the core class responsible for generating QR codes that incorporate both visible and hidden security layers. This class has attributes such as inputData, which stores the data to be encoded in the QR code, qrCodeData, which represents the generated QR code itself, securityLayer, which holds the embedded security metadata, and encryptionKey, which is used to encrypt the hidden security layer. Additionally, it maintains hashValue, which is a cryptographic hash of the QR code, qrCodeType, which determines if the QR code is static or dynamic, expirationTime, which specifies the validity period of the QR code, and dynamicRules, which governs the behavior of dynamic QR codes. The QR Code Generation System (400) includes several methods to generate, secure, and transmit QR codes, including generateQRCode, which creates a new QR code based on provided input data, embedSecurityLayer, which adds an invisible security layer, encryptSecurityLayer, which applies cryptographic encryption, and generateHash, which computes a cryptographic hash for validation purposes. The system also includes methods such as storeMetadata, which saves the QR code's attributes for future verification, determineQRCodeType, which evaluates whether a QR code is static or dynamic, applyDynamicRules, which assigns expiration or rotation properties to a QR code, and transmitQRCode, which sends the QR code to the user's device for use in transactions, authentication, or access control.

The User Device (402) class represents the mobile device, computer, or scanning tool used to interact with QR codes. This class contains attributes such as deviceID, which uniquely identifies the user's device, userID, which associates the device with a specific user, scannedQRCode, which holds the most recently scanned QR code, pushNotification-Status, which tracks whether a security approval request has been sent to the user, and biometricData, which stores biometric credentials used for identity verification. The methods within the User Device (402) class include scanQRCode, which captures a QR code for processing, submitQRCodeForVerification, which sends the scanned QR code to the verification system, receivePushNotification, which alerts the user to approve or deny a transaction, respondToPushNotification, which allows the user to confirm or reject a QR code action, and authenticateBiometric-Data, which verifies the user's identity through biometric authentication before allowing the QR code to be executed.

The QR Code Verification System (404) class is the central component that authenticates QR codes and ensures their integrity. It includes attributes such as qrCodeData, which stores the scanned QR code, retrievedMetadata, which holds the stored information associated with the QR code, verificationStatus, which tracks whether the QR code has passed validation, tamperDetectionScore, which quantifies the likelihood that the QR code has been altered, transactionRiskLevel, which evaluates the security risk of executing the QR code action, and authenticationRequired, which determines whether additional user verification is necessary. The methods implemented in this class include receiveScannedQRCode, which processes an incoming QR code scan, extractQRCodeData, which retrieves the visible and hidden layers of the QR code, retrieveMetadata, which queries the QR Code Metadata Storage (406) for stored QR code details, validateQRCodeData, which compares extracted QR code data with stored metadata, decryptSecurityLayer, which decrypts hidden QR code security layers using asymmetric cryptographic techniques, compareHashValues, which recalculates the cryptographic hash and checks for integrity violations, and sendToTamperDetection, which forwards QR code data to the AI Tamper Detection System (408) for fraud analysis. The system further implements security checks such as assessTransactionRisk, which evaluates whether a QR code action poses a high fraud risk, determineAuthenticationNeed, which decides if biometric or push notification authentication is required, validateUser- Response, which processes user approvals or rejections for QR code actions, sendTransactionRequest, which forwards payment or authentication requests to external systems, and logSecurityIncident, which records potential threats or security breaches.

The QR Code Metadata Storage (406) class is responsible for storing, retrieving, and managing QR code data. It maintains attributes such as qrCodeRecords, which stores details of generated QR codes, hashValues, which keeps a record of cryptographic hashes for integrity verification, and expirationTimes, which tracks validity periods for QR codes. Its methods include storeMetadata, which saves QR code attributes, retrieveMetadata, which fetches stored details for verification, checkExpiration, which verifies if a QR code has expired, and updateRecord, which modifies metadata when a QR code's status is updated.

The AI Tamper Detection System (408) class is designed to analyze QR codes for potential fraud. It includes attributes such as tamperDetectionScore, which represents the AI's assessment of QR code integrity, analyzedQRCode, which stores QR codes under review, and securityAnomalies, which logs detected inconsistencies. The methods implemented in this class include analyzeQRCode, which inspects QR codes for signs of manipulation, detectAnomalies, which identifies potential security breaches, computeTamperProbability, which generates a probability score indicating the likelihood of tampering, and reportSuspiciousQRCode, which flags compromised QR codes for further review.

The User Authentication System (410) class is responsible for verifying user identity during QR code transactions. It contains attributes such as userID, which associates authentication attempts with specific users, biometricData, which holds biometric credentials, and authenticationStatus, which tracks whether verification was successful. Its methods include initiateAuthentication, which begins the identity verification process, processBiometricData, which evaluates biometric input for authentication, and returnAuthenticationResult, which confirms whether the user has been successfully authenticated.

The Financial Transaction System (412) class facilitates secure payments associated with QR code transactions. It includes attributes such as transactionID, which identifies each transaction, transactionStatus, which tracks whether a payment was approved or declined, paymentAmount, which records the transaction amount, and recipientDetails, which ensures that funds are transferred to the intended recipient. Its methods include processTransaction, which executes financial transactions, validateTransactionRequest, which confirms that a QR code transaction is legitimate, and sendTransactionConfirmation, which notifies the system and user of transaction completion.

The Security Monitoring System (414) class is responsible for logging and responding to security threats. It includes attributes such as securityLogs, which maintains a record of security events, and alertStatus, which tracks whether a real-time security alert has been generated. The methods associated with this class include logSecurityIncident, which records security violations, generateSecurityAlert, which triggers alerts for potential fraud, and notifyAdministrator, which escalates serious security threats to monitoring teams.

All classes are interconnected to enable seamless communication and operation. The User Device (402) interacts with the QR Code Generation System (400) to receive generated QR codes and submits scanned QR codes to the QR Code Verification System (404) for validation. The QR Code Verification System (404) communicates with the QR Code Metadata Storage (406) to retrieve stored QR code data and sends QR code details to the AI Tamper Detection System (408) for fraud analysis. If necessary, the QR Code Verification System (404) initiates authentication requests with the User Authentication System (410) and processes financial transactions through the Financial Transaction System (412). Security incidents detected at any stage are logged in the Security Monitoring System (414), ensuring that all transactions are monitored for potential fraud.

This class diagram provides a comprehensive and structured representation of the QR Code Verification Engine, detailing the attributes and methods that each system component utilizes to ensure the secure generation, verification, authentication, and execution of QR code transactions. By incorporating encryption, AI-driven tamper detection, biometric authentication, transaction risk assessment, and real-time security alerting, the system ensures a high level of security for QR code-based interactions across various digital and physical applications.

Pseudocode exemplars for implementing various aspects of this disclosure are set forth below with explanations for reference.

Pseudocode Implementation for the QR Code Verification Engine

The QR Code Verification Engine incorporates several core features, including dual-layer QR code verification, AI-powered tamper detection, dynamic rotating QR codes, push notification validation, browser-based validation, integration with financial systems, metadata-driven authentication, offline verification, hash-based validation, centralized QR code registration, real-time security alerts, and AI-powered behavioral analysis. The following pseudocode details the implementation of these functionalities, followed by a thorough explanation of each component.

Pseudocode for Dual-Layer QR Code Generation and Verification

```
function generate_qr_code(data, security_metadata):
    visible_qr=encode_qr(data)
    hidden_layer=apply_steganography(security_metadata)
    combined_qr=merge_layers(visible_qr, hidden_layer)
    store_qr_metadata(data, security_metadata, hash(combined_qr))
    return combined_qr
function verify_qr_code(scanned_qr):
    extracted_data=decode_qr(scanned_qr)
    extracted_hidden_layer=extract_steganography(scanned_qr)
    if match_qr_metadata(extracted_data, extracted_hidden_layer):
        if validate_hash(scanned_qr):
            return "QR Code Verified"
        else:
            return "QR Code Tampered"
    else:
        return "QR Code Invalid"
```

The above pseudocode describes the dual-layer QR code generation and verification. The generate_qr_code function first encodes the primary QR code with visible data and then applies a hidden security layer using steganographic techniques. The two layers are merged to form a tamper-resistant QR code. The metadata and cryptographic hash of the QR code are stored for later verification. The verify_qr_code function extracts both the visible data and the hidden security metadata upon scanning. It compares the extracted values with the stored reference and checks the cryptographic hash to detect tampering.

Pseudocode for AI-Powered Tamper Detection

```
function detect_tampering(scanned_qr):
    features=extract_qr_features(scanned_qr)
    anomaly_score=ai_model.predict(features)
    if anomaly_score>threshold:
        return "QR Code Tampered"
    else:
        return "QR Code Safe"
```

The AI-powered tamper detection system extracts structural and visual features from the QR code and uses a trained machine learning model to analyze the likelihood of manipulation. If the anomaly score exceeds a predefined threshold, the system flags the QR code as tampered.

Pseudocode for Dynamic Rotating QR Codes

```
function generate_dynamic_qr_code(data, lifespan):
    qr_code=generate_qr_code(data, generate_security_metadata( ))
    expiration_time=current_time( )+lifespan
    store_qr_in_database(qr_code, expiration_time)
    return qr_code
function validate_dynamic_qr_code(scanned_qr):
    qr_metadata=retrieve_qr_metadata(scanned_qr)
    if current_time( )>qr_metadata.expiration_time:
        return "QR Code Expired"
    else:
        return verify_qr_code(scanned_qr)
```

This pseudocode implements dynamic QR codes that automatically expire after a given lifespan. The QR code is generated with an expiration timestamp, and validation checks ensure that expired QR codes cannot be reused.

Pseudocode for Push Notification Validation

```
function push_notification_verification(user_id, scanned_qr):
    validation_request=create_verification_request(user_id, scanned_qr)
    send_push_notification(user_id, validation_request)
    if user_approves_request(user_id):
        return "QR Code Verified"
    else:
        return "QR Code Denied"
```

Push notification validation sends a request to the user's registered mobile device for explicit confirmation before proceeding with the QR code action. If the user denies the request, the QR code is flagged as suspicious.

Pseudocode for Browser Plugin Validation

```
function scan_qr_in_browser(qr_code):
    validation_result=verify_qr_code(qr_code)
    if validation_result=="QR Code Verified":
        allow_access( )
    else:
        display_warning( )
```

The browser plugin scans QR codes in digital environments such as emails and websites. It prevents users from accessing malicious links embedded in fraudulent QR codes.

Pseudocode for Financial System Integration

```
function process_payment_via_qr(scanned_qr, user_id):
    verification_status=verify_qr_code(scanned_qr)
    if verification_status=="QR Code Verified":
        transaction_details=extract_payment_data(scanned_qr)
        process_transaction(user_id, transaction_details)
        return "Payment Successful"
```

```
else:
        return "Payment Denied: Invalid QR Code"
```

This implementation ensures that QR codes used for financial transactions are authenticated before processing payments. Only verified QR codes trigger a secure financial transaction.

Pseudocode for Metadata-Driven Authentication

```
function authenticate_qr_based_on_metadata(scanned_qr,
user_context):
    metadata=extract_qr_metadata(scanned_qr)
    if validate_context(metadata, user_context):
        return "QR Code Authorized"
    else:
        return "QR Code Restricted"
```

QR code authentication is enhanced by metadata-based rules, which enforce contextual restrictions such as location, user identity, or access conditions.

Pseudocode for Offline Verification

```
function offline_qr_verification(scanned_qr, offline_valida-
tor):
    encrypted_metadata=extract_qr_metadata(scanned_qr)
    if offline_validator.verify(encrypted_metadata):
        return "QR Code Valid"
    else:
        return "QR Code Invalid"
```

The offline verification mechanism allows users to validate QR codes without an internet connection using pre-stored encrypted metadata.

Pseudocode for Hash-Based QR Code Integrity Verification

```
function validate_qr_integrity(scanned_qr):
    stored_hash=retrieve_stored_hash(scanned_qr)
    computed_hash=hash(scanned_qr)
    if stored_hash==computed_hash:
        return "QR Code Integrity Verified"
    else:
        return "QR Code Integrity Compromised"
```

Hash-based verification ensures that QR codes have not been altered after their initial creation by comparing the computed hash with the original stored hash.

Pseudocode for Centralized QR Code Registration

```
function register_qr_code(qr_code, issuing_entity):
    store_in_verification_database(qr_code, issuing_entity)
    return "QR Code Registered"
function validate_registered_qr_code(scanned_qr):
    if is_qr_registered(scanned_qr):
        return verify_qr_code(scanned_qr)
    else:
        return "QR Code Unregistered"
```

A centralized QR code registry ensures that only authorized entities generate valid QR codes. Validation checks against the registry before allowing interactions.

Pseudocode for AI-Powered Behavioral Analysis

```
function analyze_qr_behavior(user_id, scanned_qr):
    behavior_pattern=get_user_qr_interaction_pattern(us-
er_id)
    risk_score=ai_behavior_model.predict(behavior_pattern)
    if risk_score>threshold:
        return "QR Code Interaction Suspicious"
    else:
        return "QR Code Interaction Normal"
```

The AI-powered behavioral analysis system monitors user interaction patterns with QR codes and flags unusual activity indicative of fraud.

Each aspect of the invention is implemented through an interconnected system that validates, authenticates, and secures QR codes against threats. The dual-layer QR code verification ensures that QR codes cannot be easily forged or tampered with. AI-powered tamper detection dynamically analyzes QR codes for manipulation. Dynamic rotating QR codes prevent unauthorized reuse. Push notification verification requires explicit user confirmation before executing QR-based actions. The browser plugin scans QR codes found in digital environments and prevents fraudulent interactions. Integration with financial systems ensures that only authenticated QR codes are used in financial transactions. Metadata-driven authentication adds context-sensitive security measures. Offline verification enables QR authentication without an internet connection. Hash-based verification protects against unauthorized modifications. The centralized registry ensures that only authorized QR codes are in circulation. AI-powered behavioral analysis proactively detects fraudulent QR code interactions. Through these features, the invention provides a robust, secure, and intelligent QR code verification system.

A skilled artisan, upon reviewing the disclosure, will appreciate that there are numerous alternatives, modifications, combinations, and customizations that can be made to the systems and methods described herein.

The systems and methods described herein can be modified, customized, and combined in various ways while still remaining within the spirit and scope of the disclosure. Alternative implementations, variations in deployment, and additional security enhancements can be made to optimize the QR Code Verification Engine for different use cases, industries, and security requirements. These alternatives include changes to the structure, security measures, validation techniques, deployment methods, authentication processes, and integration with other technologies.

One alternative is the use of alternative encoding techniques beyond traditional QR codes. While QR codes are the primary focus of the disclosed system, the security principles and verification methods can be applied to other machine-readable codes such as Data Matrix codes, Aztec codes, PDF417 codes, barcodes, and near-field communication (NFC) tags. These alternatives allow the system to be adapted to industries that use different machine-readable technologies, such as manufacturing, supply chain logistics, and identity verification systems.

A modification to the dual-layer QR code verification could involve using multiple hidden security layers rather than a single steganographic or watermarking layer. For example, an alternative implementation may include three or more independent validation layers, where each layer contains distinct encrypted metadata, cryptographic signatures, or AI-generated markers. This approach would increase security and ensure that even if one layer is compromised, other security mechanisms remain intact.

An alternative to AI-powered tamper detection could involve blockchain-based QR code verification, where each QR code is recorded on a decentralized ledger upon generation. A blockchain implementation would provide immutable transaction logs, making it impossible for attackers to alter QR codes without detection. The QR Code Verification Engine could retrieve and compare each scanned QR code against a blockchain record to verify its authenticity, providing an additional layer of security.

A modification to dynamic rotating QR codes could include user-specific or contextual expiration criteria rather than a fixed time-based expiration. Instead of expiring after a set duration, QR codes could rotate dynamically based on user behavior, access patterns, geolocation, or authentication level. For example, a QR code for secure facility access might expire immediately after a successful scan, whereas a QR code for a digital event ticket might remain valid until the event concludes.

The push notification verification system could be modified to support multi-factor authentication (MFA) by integrating biometric authentication, PIN verification, or hardware security tokens before approving a QR code action. In scenarios requiring heightened security, a QR code scan could trigger a push notification requiring fingerprint authentication or facial recognition before authorizing transactions or granting access. This customization strengthens authentication by requiring multiple validation steps beyond the QR code itself.

An alternative method for browser-based QR code validation could involve automated email and document scanning that preemptively flags malicious QR codes before users interact with them. This approach would integrate with enterprise security platforms and email filtering systems to scan email attachments, PDFs, and online documents containing QR codes. Suspicious QR codes could be automatically disabled, flagged, or quarantined, preventing phishing attacks before users encounter them.

A modification to the financial system integration feature could include custom payment authorization rules based on user-defined security parameters. For example, businesses could implement spending limits, time-based transaction constraints, or biometric verification before processing QR code-based payments. This approach allows organizations to customize transaction security settings based on the level of risk, user preferences, or regulatory requirements.

An alternative deployment of metadata-driven authentication could include programmable smart contracts that enforce conditional access rules based on real-world criteria. Smart contracts could define geo-fencing restrictions, real-time identity verification, or AI-generated fraud risk analysis before allowing a QR code to be processed. This would ensure that QR codes remain context-aware and adaptable to varying levels of security.

A customization of the offline verification feature could involve secure hardware-based validation using cryptographic USB devices, embedded chips, or NFC-enabled smart cards that locally validate QR codes without needing an internet connection. In environments with strict security constraints, such as government facilities or military installations, QR code validation could be performed entirely on air-gapped systems without exposing data to external networks.

A modification to the hash-based QR code integrity verification could involve using quantum-resistant cryptographic techniques to future-proof QR code validation against emerging quantum computing threats. Post-quantum cryptographic algorithms such as lattice-based cryptography or hash-based signatures could replace traditional hashing methods to ensure that QR codes remain secure against advanced cryptographic attacks in the future.

A combination of centralized and decentralized QR code registration systems could be implemented to balance security and scalability. Organizations requiring high levels of control could opt for private centralized registries, whereas industries needing broader public verification could use decentralized registries with distributed authentication nodes. Hybrid approaches could allow businesses to maintain internal control while enabling third-party verifications through blockchain-based consensus mechanisms.

A modification to AI-powered behavioral analysis could involve predictive fraud detection using federated learning models, where the QR Code Verification Engine learns from anonymized global fraud patterns without compromising user privacy. This approach would improve fraud detection accuracy while complying with data privacy regulations by training machine learning models across multiple secure environments without sharing raw data.

An alternative application of the QR Code Verification Engine could involve automated counterfeit detection in retail and supply chain industries, where QR codes embedded in product packaging could be verified at multiple checkpoints to confirm product authenticity. This system could integrate with RFID tracking, IoT sensors, and AI-driven anomaly detection to prevent counterfeit goods from entering supply chains.

A customization of the real-time security alert system could include adaptive threat intelligence, where alerts are prioritized based on risk level, user role, and contextual factors. For example, an administrator managing high-risk financial transactions may receive immediate notifications with emergency response options, while low-risk users may receive informational alerts with recommended actions.

An alternative implementation could extend QR code security to augmented reality (AR) and mixed reality (MR) environments, where QR codes can be embedded within virtual interfaces, smart glasses, or holographic displays. AR-based QR code interactions could enable real-time digital authentication in enterprise and consumer applications, providing a more immersive and intuitive validation experience.

A modification to user and context-specific QR validation could include voice-activated QR scanning, where users can authorize QR code interactions through voice recognition commands combined with secure voiceprints. This approach could enhance accessibility for users with disabilities while providing a secure, hands-free authentication experience.

A customization of fraud prevention in marketing QR codes could involve AI-generated dynamic branding markers, where QR codes visually adapt to include real-time company logos, watermarks, or AI-generated brand security elements that dynamically change based on location, user interaction history, or marketing campaign data. This technique would prevent unauthorized duplication and ensure brand integrity.

A combination of multi-device QR validation could involve synchronizing QR code interactions across multiple user devices, ensuring that authentication requests must be validated from a user's primary device. For example, if a user scans a QR code on a laptop, the authentication request could be sent to their registered mobile device for additional verification.

A further customization of enterprise security integration could allow QR code validation systems to work in zero-trust environments, where every QR code scan must undergo continuous authentication, real-time AI risk scoring, and multi-layered security checks before access is granted.

These alternatives, modifications, combinations, and customizations demonstrate the versatility of the QR Code Verification Engine and its ability to be adapted for a wide range of applications while maintaining security, usability, and scalability. The spirit and scope of this disclosure encompass all such variations that align with the core principles of QR code authentication, fraud prevention, and secure digital interactions.

Although the present technology has been described based on what is currently considered the most practical and preferred implementations, it is to be understood that this detail is only for that purpose and this disclosure is not limited to the sample descriptions and implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A method for verifying and securing a QR code performed by a computing device that includes a processor and a non-volatile memory storing computer executable instructions, the method comprising:

receiving, by a QR code generation system, input data for encoding into a QR code, wherein the input data comprises transaction details, authentication credentials, or access control parameters;

generating, by the QR code generation system, a visible QR code encoding the input data;

embedding, by a security module of the QR code generation system, a hidden security layer within the QR code using steganographic encoding or invisible watermarking, wherein the hidden security layer comprises encrypted metadata corresponding to the input data;

storing, by a verification server, a record of the QR code including the input data, the hidden security layer, and a cryptographic hash of the QR code;

receiving, by a QR code scanning device, a scanned QR code from a user interaction;

extracting, by the QR code scanning device, the input data from the scanned QR code and decoding, by the security module, the hidden security layer embedded within the scanned QR code;

validating, by the verification server, the scanned QR code by comparing the extracted input data and the decoded hidden security layer with the corresponding stored record;

determining, by the verification server, whether the cryptographic hash of the scanned QR code matches the stored cryptographic hash, thereby detecting unauthorized modifications or tampering;

analyzing, by an AI-powered tamper detection module comprising a machine learning model, the scanned QR code for anomalies indicative of fraudulent alterations by extracting features from the scanned QR code, predicting an anomaly score using the machine learning model, and determining if the anomaly score exceeds a predefined threshold, wherein the anomalies include pixel distortions, metadata inconsistencies, or unexpected steganographic modifications;

determining, by the AI-powered tamper detection module, whether the scanned QR code exhibits a tampering probability exceeding the predefined threshold, and flagging the scanned QR code as suspicious when the threshold is exceeded;

determining, by a dynamic QR code engine, whether the scanned QR code is a dynamically generated QR code and verifying, by the verification server, whether the scanned QR code remains valid based on a predefined expiration time, rotation schedule, or user-specific conditions;

transmitting, by the verification server, a push notification to a user device requesting confirmation of the scanned QR code's intended action, wherein the push notification contains validation details associated with the QR code;

receiving, by the verification server, a user approval or rejection of the scanned QR code through a secure authentication process on the user device;

preventing, by an access control module, execution of an action associated with the scanned QR code when the verification server determines that the cryptographic hash does not match, the AI-powered tamper detection module flags the QR code as suspicious, or the user rejects the push notification request;

validating, by a browser plugin security module, a QR code encountered in an online environment, wherein the browser plugin security module scans the QR code embedded in a digital document, email, or webpage and transmits the scanned QR code to the verification server for authentication prior to user interaction;

determining, by a financial transaction processor, whether the scanned QR code corresponds to a financial transaction, and processing, by the financial transaction processor, a payment only when the verification server confirms the authenticity of the QR code;

verifying, by an offline authentication module, a scanned QR code in an offline environment using an encrypted metadata validation process, wherein the offline authentication module extracts and decodes the embedded security layer from the scanned QR code without requiring network connectivity;

determining, by a contextual security module, whether the scanned QR code meets predefined contextual security criteria, wherein the contextual security criteria include geographic location, user identity, device fingerprinting, or access control rules;

logging, by a centralized QR code registry, validation results and security alerts related to the scanned QR code, wherein the centralized QR code registry maintains a record of authenticated QR codes, security incidents, and fraud detection metrics;

analyzing, by a behavioral analysis engine, historical QR code interaction data of a user, determining, by the behavioral analysis engine, whether the scanned QR code interaction deviates from expected behavioral patterns, and flagging the scanned QR code as suspicious when the deviation exceeds a predefined threshold;

generating, by the verification server, a security alert when the scanned QR code is determined to be tampered, expired, unregistered, suspicious based on behavioral analysis, or rejected by the user, and transmitting, by the verification server, the security alert to a security monitoring system or the user device; and wherein the execution of any action associated with the scanned QR code is permitted only when the verification server confirms the authenticity of the QR code, the AI-powered tamper detection module does not detect anomalies, the cryptographic hash matches the stored hash, the push notification request is approved by the user, and the contextual security criteria are satisfied.

2. The method of claim 1, wherein the hidden security layer further comprises an encryption key unique to each generated QR code, and wherein the verification server decrypts the hidden security layer using the encryption key prior to performing validation.

3. The method of claim 2, wherein the encryption key is generated using asymmetric cryptographic techniques, wherein a public-private key pair is used to encrypt and decrypt the hidden security layer to ensure that only the verification server can validate the QR code.

4. The method of claim 3, wherein the verification server further associates the encryption key with a registered user account, such that only authorized users are able to generate or validate QR codes through the system.

5. The method of claim 4, wherein the verification server further determines whether the scanned QR code is associated with a transaction exceeding a predefined risk threshold, and wherein the verification server initiates an additional security measure, comprising a secondary biometric authentication request, when the predefined risk threshold is exceeded.

6. The method of claim 5, wherein the biometric authentication request comprises requiring the user to authenticate using fingerprint recognition, facial recognition, or voice authentication through the user device before validating the scanned QR code.

7. The method of claim 6, wherein the verification server further logs a record of the biometric authentication attempt, including whether the authentication was successful or failed, and wherein the record is stored in the centralized QR code registry for fraud analysis.

8. The method of claim 7, wherein the browser plugin security module further determines whether the scanned QR code is embedded in an email, and wherein the verification server scans metadata associated with the email to determine whether the email originates from a trusted sender before validating the QR code.

9. The method of claim 8, wherein the financial transaction processor further determines whether the scanned QR code is associated with a cross-border financial transaction, and wherein the verification server verifies the compliance of the transaction with applicable jurisdictional regulations before approving payment processing.

10. The method of claim 9, wherein the behavioral analysis engine further updates a dynamic fraud risk score associated with the user based on repeated interactions with QR codes, and wherein the verification server modifies the security requirements for future QR code interactions based on the fraud risk score.

11. A method for verifying and securing a QR code performed by a computing device that includes a processor and a non-volatile memory storing computer executable instructions, the method comprising:

receiving, by a QR code generation system, input data for encoding into a QR code, wherein the input data comprises transaction details, authentication credentials, or access control parameters associated with a registered user account;

generating, by the QR code generation system, a visible QR code encoding the input data;

embedding, by a security module of the QR code generation system, a hidden security layer within the QR code using steganographic encoding or invisible watermarking, wherein the hidden security layer comprises encrypted metadata corresponding to the input data and an encryption key unique to the generated QR code;

encrypting, by the security module, the hidden security layer using asymmetric cryptographic techniques, wherein a public-private key pair is used to encrypt and decrypt the hidden security layer to ensure that only the verification server can validate the QR code;

storing, by a verification server, a record of the QR code including the input data, the hidden security layer, the encryption key, and a cryptographic hash of the QR code, wherein the encryption key is associated with the registered user account;

receiving, by a QR code scanning device, a scanned QR code from a user interaction;

extracting, by the QR code scanning device, the input data from the scanned QR code and decoding, by the security module, the hidden security layer embedded within the scanned QR code using the corresponding encryption key;

validating, by the verification server, the scanned QR code by comparing the extracted input data and the decoded hidden security layer with the corresponding stored record;

determining, by the verification server, whether the cryptographic hash of the scanned QR code matches the stored cryptographic hash, thereby detecting unauthorized modifications or tampering;

analyzing, by an AI-powered tamper detection module comprising a machine learning model, the scanned QR code for anomalies indicative of fraudulent alterations by extracting features from the scanned QR code, predicting an anomaly score using the machine learning model, and determining if the anomaly score exceeds a predefined threshold, wherein the anomalies include pixel distortions, metadata inconsistencies, or unexpected steganographic modifications;

determining, by the AI-powered tamper detection module, whether the scanned QR code exhibits a tampering probability exceeding the predefined threshold, and flagging the scanned QR code as suspicious when the threshold is exceeded;

determining, by a dynamic QR code engine, whether the scanned QR code is a dynamically generated QR code and verifying, by the verification server, whether the scanned QR code remains valid based on a predefined expiration time, rotation schedule, or user-specific conditions;

determining, by the verification server, whether the scanned QR code is associated with a transaction exceeding a predefined risk threshold, and initiating, by the verification server, an additional security measure comprising a secondary biometric authentication request when the predefined risk threshold is exceeded;

transmitting, by the verification server, a biometric authentication request to a user device, wherein the biometric authentication request requires the user to authenticate using fingerprint recognition, facial recognition, or voice authentication before validating the scanned QR code;

receiving, by the verification server, a result of the biometric authentication request and storing, by the centralized QR code registry, a record of the biometric authentication attempt including whether the authentication was successful or failed;

transmitting, by the verification server, a push notification to the user device requesting confirmation of the scanned QR code's intended action, wherein the push notification contains validation details associated with the QR code;

receiving, by the verification server, a user approval or rejection of the scanned QR code through a secure authentication process on the user device;

preventing, by an access control module, execution of an action associated with the scanned QR code when the verification server determines that the cryptographic hash does not match, the AI-powered tamper detection module flags the QR code as suspicious, the user rejects the push notification request, or the biometric authentication request fails;

validating, by a browser plugin security module, a QR code encountered in an online environment, wherein the browser plugin security module scans the QR code embedded in a digital document, email, or webpage and transmits the scanned QR code to the verification server for authentication prior to user interaction;

determining, by the browser plugin security module, whether the scanned QR code is embedded in an email and scanning, by the verification server, metadata associated with the email to determine whether the email originates from a trusted sender before validating the QR code;

determining, by a financial transaction processor, whether the scanned QR code corresponds to a financial transaction, verifying, by the verification server, compliance of the financial transaction with applicable jurisdictional regulations, and processing, by the financial transaction processor, the payment only when the verification server confirms the authenticity of the QR code;

verifying, by an offline authentication module, a scanned QR code in an offline environment using an encrypted metadata validation process, wherein the offline authentication module extracts and decodes the embedded security layer from the scanned QR code without requiring network connectivity;

determining, by a contextual security module, whether the scanned QR code meets predefined contextual security criteria, wherein the contextual security criteria include geographic location, user identity, device fingerprinting, or access control rules;

logging, by a centralized QR code registry, validation results and security alerts related to the scanned QR code, wherein the centralized QR code registry maintains a record of authenticated QR codes, security incidents, and fraud detection metrics;

analyzing, by a behavioral analysis engine, historical QR code interaction data of a user, determining, by the behavioral analysis engine, whether the scanned QR code interaction deviates from expected behavioral patterns, and flagging the scanned QR code as suspicious when the deviation exceeds a predefined threshold;

updating, by the behavioral analysis engine, a dynamic fraud risk score associated with the user based on repeated interactions with QR codes, and modifying, by the verification server, the security requirements for future QR code interactions based on the fraud risk score;

generating, by the verification server, a security alert when the scanned QR code is determined to be tampered, expired, unregistered, suspicious based on behavioral analysis, or rejected by the user, and transmitting, by the verification server, the security alert to a security monitoring system or the user device; and wherein the execution of any action associated with the scanned QR code is permitted only when the verification server confirms the authenticity of the QR code, the AI-powered tamper detection module does not detect anomalies, the cryptographic hash matches the stored hash, the push notification request is approved by the user, the biometric authentication request is successful, and the contextual security criteria are satisfied.

12. A system for verifying and securing a QR code, the system comprising:

a QR code generation system configured to receive input data for encoding into a QR code, wherein the input data comprises transaction details, authentication credentials, or access control parameters associated with a registered user account;

a QR code encoding module configured to generate a visible QR code encoding the input data;

a security module configured to embed a hidden security layer within the QR code using steganographic encoding or invisible watermarking, wherein the hidden security layer comprises encrypted metadata corresponding to the input data and an encryption key unique to the generated QR code;

an encryption module configured to encrypt the hidden security layer using asymmetric cryptographic techniques, wherein a public-private key pair is used to encrypt and decrypt the hidden security layer to ensure that only a verification server can validate the QR code;

a verification server configured to store a record of the QR code including the input data, the hidden security layer, the encryption key, and a cryptographic hash of the QR code, wherein the encryption key is associated with the registered user account;

a QR code scanning device configured to receive a scanned QR code from a user interaction and extract the input data from the scanned QR code;

a decoding module within the QR code scanning device configured to decode the hidden security layer embedded within the scanned QR code using the corresponding encryption key;

a validation module within the verification server configured to compare the extracted input data and the decoded hidden security layer with the corresponding stored record to determine authenticity;

a hash verification module configured to determine whether the cryptographic hash of the scanned QR code matches the stored cryptographic hash, thereby detecting unauthorized modifications or tampering;

an AI-powered tamper detection module comprising a machine learning model configured to analyze the scanned QR code for anomalies indicative of fraudulent alterations by extracting features from the scanned QR code, predicting an anomaly score using the machine learning model, and determining if the anomaly score exceeds a predefined threshold, wherein the anomalies include pixel distortions, metadata inconsistencies, or unexpected steganographic modifications;

a tampering determination module configured to determine whether the scanned QR code exhibits a tampering probability exceeding the predefined threshold and flag the scanned QR code as suspicious when the threshold is exceeded;

a dynamic QR code engine configured to determine whether the scanned QR code is a dynamically generated QR code and to verify whether the scanned QR code remains valid based on a predefined expiration time, rotation schedule, or user-specific conditions;

a risk assessment module configured to determine whether the scanned QR code is associated with a transaction exceeding a predefined risk threshold and to initiate an additional security measure comprising a secondary biometric authentication request when the predefined risk threshold is exceeded;

a biometric authentication module configured to transmit the biometric authentication request to a user device, wherein the biometric authentication request requires the user to authenticate using fingerprint recognition, facial recognition, or voice authentication before validating the scanned QR code;

a biometric validation module configured to receive a result of the biometric authentication request and store a record of the biometric authentication attempt, including whether the authentication was successful or failed, within a centralized QR code registry;

a push notification module configured to transmit a push notification to the user device requesting confirmation of the scanned QR code's intended action, wherein the push notification contains validation details associated with the QR code;

a user response module configured to receive a user approval or rejection of the scanned QR code through a secure authentication process on the user device;

an access control module configured to prevent execution of an action associated with the scanned QR code when the verification server determines that the cryptographic hash does not match, the AI-powered tamper detection module flags the QR code as suspicious, the user rejects the push notification request, or the biometric authentication request fails;

a browser plugin security module configured to validate a QR code encountered in an online environment, wherein the browser plugin security module scans the QR code embedded in a digital document, email, or webpage and transmits the scanned QR code to the verification server for authentication prior to user interaction;

an email security module configured to determine whether the scanned QR code is embedded in an email and to scan metadata associated with the email to determine whether the email originates from a trusted sender before validating the QR code;

a financial transaction processor configured to determine whether the scanned QR code corresponds to a financial transaction, to verify compliance of the financial transaction with applicable jurisdictional regulations, and to process the payment only when the verification server confirms the authenticity of the QR code;

an offline authentication module configured to verify a scanned QR code in an offline environment using an encrypted metadata validation process, wherein the offline authentication module extracts and decodes the embedded security layer from the scanned QR code without requiring network connectivity;

a contextual security module configured to determine whether the scanned QR code meets predefined contextual security criteria, wherein the contextual security criteria include geographic location, user identity, device fingerprinting, or access control rules;

a centralized QR code registry configured to log validation results and security alerts related to the scanned QR code, wherein the centralized QR code registry maintains a record of authenticated QR codes, security incidents, and fraud detection metrics;

a behavioral analysis engine configured to analyze historical QR code interaction data of a user, determine whether the scanned QR code interaction deviates from expected behavioral patterns, and flag the scanned QR code as suspicious when the deviation exceeds a predefined threshold;

a fraud risk management module configured to update a dynamic fraud risk score associated with the user based on repeated interactions with QR codes and to modify the security requirements for future QR code interactions based on the fraud risk score;

a security alert module configured to generate a security alert when the scanned QR code is determined to be tampered, expired, unregistered, suspicious based on behavioral analysis, or rejected by the user, and to transmit the security alert to a security monitoring system or the user device; and wherein the execution of any action associated with the scanned QR code is permitted only when the verification server confirms the authenticity of the QR code, the AI-powered tamper detection module does not detect anomalies, the cryptographic hash matches the stored hash, the push notification request is approved by the user, the biometric authentication request is successful, and the contextual security criteria are satisfied.

13. The system of claim 12, wherein the encryption module is further configured to generate a unique encryption key for each QR code using a quantum-resistant cryptographic algorithm, wherein the cryptographic algorithm comprises lattice-based encryption, hash-based signatures, or post-quantum key exchange methods.

14. The system of claim 13, wherein the verification server further comprises a multi-factor authentication module configured to require a secondary authentication factor in addition to the biometric authentication request, wherein the secondary authentication factor includes a one-time passcode sent via SMS, email, or an authentication application.

15. The system of claim 14, wherein the multi-factor authentication module is further configured to determine an authentication risk level for the scanned QR code based on user behavior patterns, transaction history, and geolocation data, and wherein the module dynamically adjusts authentication requirements based on the authentication risk level.

16. The system of claim 15, wherein the behavioral analysis engine further comprises a machine learning model trained to detect anomalies in user QR code interactions, wherein the model uses historical QR code scans, device usage history, and biometric authentication trends to predict potential fraud attempts.

17. The system of claim 16, wherein the security alert module further comprises an adaptive threat intelligence system configured to categorize security alerts based on severity levels, wherein the severity levels are determined based on real-time fraud analytics, contextual security data, and AI-based risk scoring.

18. The system of claim 17, wherein the contextual security module is further configured to enforce dynamic QR code access restrictions based on real-time environmental conditions, wherein the environmental conditions include network security status, Wi-Fi access point trust level, and real-time cybersecurity threat reports.

19. The system of claim 18, wherein the centralized QR code registry further comprises an audit logging module configured to store detailed event logs of QR code interactions, wherein the event logs include QR code generation timestamps, verification timestamps, biometric authentication status, and fraud detection outcomes.

20. The system of claim 19, wherein the offline authentication module is further configured to validate a scanned QR code using an embedded cryptographic proof, wherein the cryptographic proof is verified locally by a secure enclave or trusted execution environment within the QR code scanning device.

* * * * *